(12) United States Patent
Stout

(10) Patent No.: US 9,807,928 B1
(45) Date of Patent: Nov. 7, 2017

(54) LIMB AND BRANCH TRIMMING APPARATUS

(71) Applicant: Joseph W. Stout, Benton, AR (US)

(72) Inventor: Joseph W. Stout, Benton, AR (US)

( * ) Notice: Subject to any disclaimer, the term of this patent is extended or adjusted under 35 U.S.C. 154(b) by 0 days.

(21) Appl. No.: 15/499,624

(22) Filed: Apr. 27, 2017

(51) Int. Cl.
| | |
|---|---|
| A01G 3/00 | (2006.01) |
| A01D 34/44 | (2006.01) |
| A01D 34/56 | (2006.01) |
| A01D 34/52 | (2006.01) |
| A01D 34/835 | (2006.01) |
| A01G 3/053 | (2006.01) |
| A01D 101/00 | (2006.01) |

(52) U.S. Cl.
CPC ............. *A01D 34/44* (2013.01); *A01D 34/52* (2013.01); *A01D 34/56* (2013.01); *A01D 34/835* (2013.01); *A01G 3/053* (2013.01); *A01D 2101/00* (2013.01)

(58) Field of Classification Search
CPC ...... A01D 34/64; A01D 34/866; A01D 34/44; A01D 34/52; A01D 34/56; A01D 34/835; A01G 3/08; A01G 3/0426; A01G 23/095; A01G 3/053; B23D 45/105; B23D 45/10; B23D 47/12; B27B 5/10; B27B 17/08; B27B 17/0091; E02F 3/12; E02F 5/06
USPC ..... 30/379, 380, 382; 56/6, 13.8, 15.5, 17.1, 56/235, 295, 233; 144/4.1, 24.13, 251.1, 144/335, 343
See application file for complete search history.

(56) References Cited

U.S. PATENT DOCUMENTS

| | | | |
|---|---|---|---|
| 3,138,911 A | 6/1964 | Pounds | |
| 3,597,908 A | 8/1971 | Schaefer | |
| 4,302,922 A * | 12/1981 | Guerndt, Jr. | ........... B23D 45/10 |
| | | | 56/235 |
| 4,577,457 A | 3/1986 | Grant | |
| 4,627,227 A | 12/1986 | Dixon | |
| 4,815,263 A | 3/1989 | Hartung et al. | |
| 4,869,056 A * | 9/1989 | Lynch | .................. A01D 34/866 |
| | | | 172/98 |
| 4,949,534 A * | 8/1990 | Evans | .................... A01D 34/64 |
| | | | 56/13.8 |
| 5,430,998 A * | 7/1995 | Albrecht | ................ A01D 44/00 |
| | | | 56/290 |
| 5,430,999 A | 7/1995 | Grant | |
| 6,085,505 A | 7/2000 | Edwards | |
| 6,311,746 B1 | 11/2001 | Halvorson et al. | |
| 7,418,985 B2 * | 9/2008 | Torgersen | ................ A01G 3/08 |
| | | | 144/4.1 |
| 8,322,385 B2 | 12/2012 | Kauppila | |
| 8,720,596 B1 * | 5/2014 | Martinez | ................ A01B 45/00 |
| | | | 172/63 |

(Continued)

*Primary Examiner* — Robert E Pezzuto
(74) *Attorney, Agent, or Firm* — Rashauna Norment

(57) ABSTRACT

A limb and branch trimming apparatus includes a frame having a support platform and an upstanding mast member; a cutting assembly having a plurality of cutting members, wherein the cutting members are rotatably connected at the mast member; and a power source for powering the cutting members independently from the vehicle's power source. The support platform of the limb and branch trimming apparatus is removably mountable to or near the top front portion of a vehicle. The apparatus is used for vertically cutting limbs, branches, and brush along a walkway, pathway, or trail where a tractor would typically be too large to navigate said pathway or trail.

5 Claims, 21 Drawing Sheets

(56) References Cited

U.S. PATENT DOCUMENTS

2002/0078672 A1* 6/2002 Hubscher ............... A01D 34/64
56/14.7
2014/0299230 A1 10/2014 Cox

* cited by examiner

LIMB AND BRANCH TRIMMING APPARATUS

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention generally relates to a limb and branch trimming apparatus having a cutting assembly for vertically cutting limbs, branches, and brush along a walkway, pathway, or trail. More particularly, the invention is a limb and branch trimming apparatus comprising a cutting assembly that has a plurality of cutting members and a rotating means; an independent power source that powers the cutting assembly; and a frame that has a support platform and a substantially upstanding mast member. The support frame is mountable on or to, a vehicle, wherein the vehicle includes, but is not limited to, all-terrain vehicles ("ATV"), utility vehicles ("UTV"), or golf carts. The mast member supports the cutting assembly.

2. Description of Arguably Related Art. Including Information Disclosed for 37 CFR 1.97 and 1.98

Vertically trimming or cutting back limbs, branches, and brush from a walkway, pathway, or trail can be problematic when using a conventional mower or tractor that only has a horizontal cutting assembly. Some walkways, pathways, or trails (collectively, a "trail") extend for miles. Many trails vary in width and in terrain. These trail conditions make using a tractor to trim along the trail unsuitable. Tree limbs, branches, or brush can extend above the trail at a height above the conventional mower or tractor's cutting capabilities. Many of these cutting tools do not have an independent or separate powering means, and instead rely on the motor or engine power from the tractor or mower. Some limb and branch trimmer attachments are available that have a vertical or semi-vertical cutting attachment. Problems in the structural arrangement or function of these upstanding cutting attachments still exist. Since most cutting attachments cannot be mounted onto an ATV, UTV, or golf cart type vehicle, conventional tractors are used. A conventional tractor that has an upstanding boom arm and cutting attachment is problematic in that the tractor may be too large to access the narrower width of the trail. In addition, a tractor may exert too much force on an auxiliary cutting apparatus during a bind if a limb snags. A snagged limb would typically stop the cutting assembly yet the tractor would continue moving. This continued movement of the tractor will typically result in damage to the cutting assembly.

U.S. Pat. No. 4,577,457 issued to Grant discloses a tree trimming and shaping apparatus that has a support frame, a cutter means positioned on an upstanding mast means, and a drive means for powering the cutter means. The support frame is mounted on a vehicle. The support frame has a support platform to which the drive means is mounted. The mast means is mounted on the support frame, with the mast means extending upwardly and outwardly from one side of the vehicle. The mast means has a support plate and a flange along the rear edge of the mast means to protect the operator from flying debris. To maintain, the upper end of the support plate in position, an adjustable link connects the upper portion of the plate with the support frame. The cutter means is attached to the mast means and is adapted to shape the tree in an inverted cone shape as the operator guides the apparatus around the tree. The cutter means has a plurality of cutter heads. The drive means is an internal combustion engine positioned on the support platform by a motor mount. Grant does not disclose, teach or suggest all the features of the present invention. It does not disclose the mast means having two side walls forming a channel for holding the components of the cutter heads, and a top plate. It also does not disclose a support frame having two opposing shoulders or base stiffeners, an angled corner, or a drive shaft support member. It also does not disclose a clutch system to protect the apparatus.

U.S. Pat. No. 8,322,385 issued to Kauppila discloses a trail cutting apparatus that has a horizontal connection connected to a boom which supports a cutter means, with the cutter being mounted on the outer sidewall. The cutter means may be powered by a drive motor, such as a hydraulic motor or an electric motor. Kauppila does not disclose, teach or suggest all the features of the present invention. It does not disclose the boom having two side walls forming a channel for holding the components of the circular saw blades, a rear wall, and a top plate. It also does not disclose a support frame having two opposing shoulders or base stiffeners, an angled corner, a drive shaft support member, and an internal combustion engine. Safety concerns also arise because many of these vertical cutter attachment devices do not have a shield or deflector for deflecting cut or stray limbs from reaching the driver. It also does not disclose a clutch system to protect the apparatus.

U.S. Patent Application Publication No. 2014/0299230 filed by Cox discloses a tree trimming apparatus that has an internal combustion engine operatively connected to a saw assembly, and a boom arm supporting the saw assembly. The saw assembly is a plurality of circular saw blades. Cox also discloses other tree trimming products that have a plurality of rotating circular saw blades on a boom. The circular saw blades are also powered by, an internal combustion engine that is mounted on a drive or engine section assembly. The blades rotate in a vertical plane when operational. The severed branches fall away on the boom side of the apparatus. Cox does not disclose, teach or suggest all the features of the present invention. It does not disclose a mast member having a top plate, a rear wall, or opposing side walls that form a channel to support the circular saw blades components. It also does not disclose a lateral support frame that is mountable to a vehicle and that supports the engine, or that the support frame has support frame two opposing shoulders or base stiffeners, an angled corner, a drive shaft support member.

Therefore, a need exists for a limb and branch trimming apparatus that has a cutting assembly that has a plurality of cutting members and a rotating means, with the cutting assembly being coupled to an upstanding mast member, an independent power source that powers the cutting assembly, and a frame that has a support platform and the mast member, with the frame being removably mountable to a vehicle for vertically cutting tree limbs, branches, and brush along a trail.

A need exists for a limb and branch trimming apparatus that is cost effective and efficient to manufacture, assemble, and use.

A need exists for a limb and branch trimming apparatus that is independently powered by its own powering means.

A need exists for a limb and branch trimming apparatus that is mountable on an ATV, UTV, golf cart, or other substantially similar sized motorized vehicle, so that the apparatus can navigate pathways and trails that are too narrow for a typical tractor to travel.

A need exists for a limb and branch trimming apparatus that has a plurality of circular saw blades coupled to an upstanding mast member, a frame removably mountable to the front and/or top of a vehicle, and an independent powering means for powering the circular saw blades.

A need exists for a limb and branch trimming apparatus that further has at least one modular attachment member, with each modular attachment member having at least one circular saw blade and a mounting means for mounting the modular attachment member to the apparatus' main mast member.

Other needs solved by the invention will become apparent from the summary, the written description, and the drawing for the invention.

SUMMARY OF THE INVENTION

In one embodiment of the invention, the invention is a limb and branch trimming apparatus that is removably mountable to a vehicle. The apparatus comprises (includes or has):

1. a cutting assembly having a plurality of cutting members and a rotating means for rotatably driving each of the cutting members;
2. a support platform having an upstanding brace, two shoulders, a corner plate, and an upstanding shaft support plate, wherein the support platform supports a powering means, and wherein the support platform is removably mountable to the vehicle;
3. a mast member having a rear wall, a top plate, and two side walls, with each of the side walls having a plurality of bores, wherein the mast member supports the cutting assembly in a substantially vertical orientation, and wherein the mast member is supported by the support platform; and
4. a powering means for powering the cutting assembly independently from a vehicle's powering means.

In another embodiment, the apparatus comprises:

A. a cutting assembly having a plurality of cutting members and a pulley system, each of the cutting members having a fastening mechanism, and the pulley system having a plurality of groove pulleys and a plurality of belts, with each of the belts traveling about the respective grooves in the pulleys;
B. a power source having an internal combustion engine for powering both a drive assembly and the cutting assembly independently from, a vehicle's power source;
C. a frame comprising
  1. a support platform having a base, an upstanding brace, a first shoulder and a second shoulder, a corner plate, and an upstanding shaft support plate supporting a main drive shaft member therein; and
  2. an upstanding mast member having a first outer side wall and a second inner side wall, a rear wall, and a top plate, with the top plate abutting both the top of the two side walls and the rear wall, with each of the side walls defining a plurality of bores for receiving each fastening mechanism of the cutting members; and
D. a drive assembly having the main drive shaft member and a plurality of slave shaft members, with the drive shaft member being coupled to both a power source and to at least one of the cutting members, for rotatably driving the cutting members, wherein a proximal first end of the drive shaft member being rotatably insertable through each of the shaft support plate, one of the mast member side wall bores, and one of the cutting members, with the drive shaft member being rotatably secured with a fastener, with one of each of the plurality of slave shaft members coupled to one of each of the plurality of cutting members and the pulley system, and wherein a distal second end of the main drive shaft member being coupled to the engine;
E. wherein the support platform supports the power source and the mast member, with the base of the support platform removably mountable to the vehicle;
F. wherein the side walls of the mast member abuts the support platform, with one of each of the plurality of cutting members being rotatably installed at the outer side wall bore and secured with the fastening mechanism;
G. wherein the side walls form a channel, with the aligned bores of each of the side walls supporting both the slave shaft members and the drive shaft member, with the outer side wall offset from the edge of the rear wall.

The mast member is used as a shield or a guard to prevent small limb debris from hitting the driver. Each of the cutting members is positioned at or to, the outer first side wall of the mast member. The outer first side wall is the proximal section of the apparatus, and is the side wall closest to the cutting area along the trail. The inner second side wall and the powering means are each located toward the distal sections of the apparatus. The location of the cutting members provides easy access to overhanging limbs, branches, and brush. The upstanding parallel side walls form a channel that supports the fastening mechanism of each of the cutting members. The powering means is preferably a conventional gasoline or diesel internal combustion engine or motor. The powering means also includes a drive assembly for transferring power from the engine to the cutting assembly.

The "vehicle" may be a motorized vehicle which includes, but is not limited to, all-terrain vehicles, utility terrain vehicles, and golf carts. Manual manipulation of a non-motorized vehicle is not a suitable vehicle for use with the apparatus. The support platform of the frame may be removably coupled to a front and/or top portion of the vehicle so that the support frame extends substantially perpendicularly from the front of the vehicle. Once the apparatus is installed on the vehicle, the mast member is suspended substantially vertically from the support platform so that the cutting members are in a substantially vertical orientation in relation to the vehicle.

A purpose for the apparatus is for the apparatus to be used with a small and agile vehicle, such as a utility vehicle or all-terrain vehicle, in order to travel along tight or narrow trails. Another reason for using a small motorized vehicle is that the vehicle does not have enough of its own power to overrun the apparatus if the cutting members snag on a limb or branch. Instead, the small motorized vehicle will halt or otherwise substantially slow down due to the force and jolt of the apparatus' blades snagging on a limb or branch. If a tractor were used, however, the apparatus would most likely be damaged and ripped off the tractor as the tractor continues down the trail. The apparatus is preferably mounted at the front and/or top of the small motorized vehicle for safety reasons. If the apparatus were mounted at a towing position behind the vehicle, the operator would not be able to control what is being trimmed or where, the trimming is taking place. Furthermore, a towed apparatus raises safety concerns due to flying debris and the rotation of the cutting blades.

It is an object of the present invention to provide a limb and branch trimming apparatus that has a plurality of cutting members and a rotating means, with the cutting assembly being coupled to an upstanding mast member, an independent power source that powers the cutting assembly, and a frame that has a support, platform and the mast member, with the frame being removably mountable to a vehicle for vertically cutting tree limbs, branches, and brush along a trail.

It is another object of the present invention to provide a limb and branch trimming apparatus that is cost effective and efficient to manufacture, assemble, and use.

It is another object of the present invention to provide a limb and branch trimming apparatus that is independently powered by its own powering means.

It is an object of the present invention to provide a limb and branch trimming apparatus that has a plurality of circular saw blades coupled to an upstanding mast member, a frame removably mountable to a vehicle, and an independent powering means for powering the circular saw blades.

It is an object of the present invention to provide a limb and branch trimming apparatus that further has a modular attachment member, with each modular attachment member having at least one circular saw blade and a mounting means for mounting the modular attachment member to the apparatus' main mast member.

These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

Figure 9:
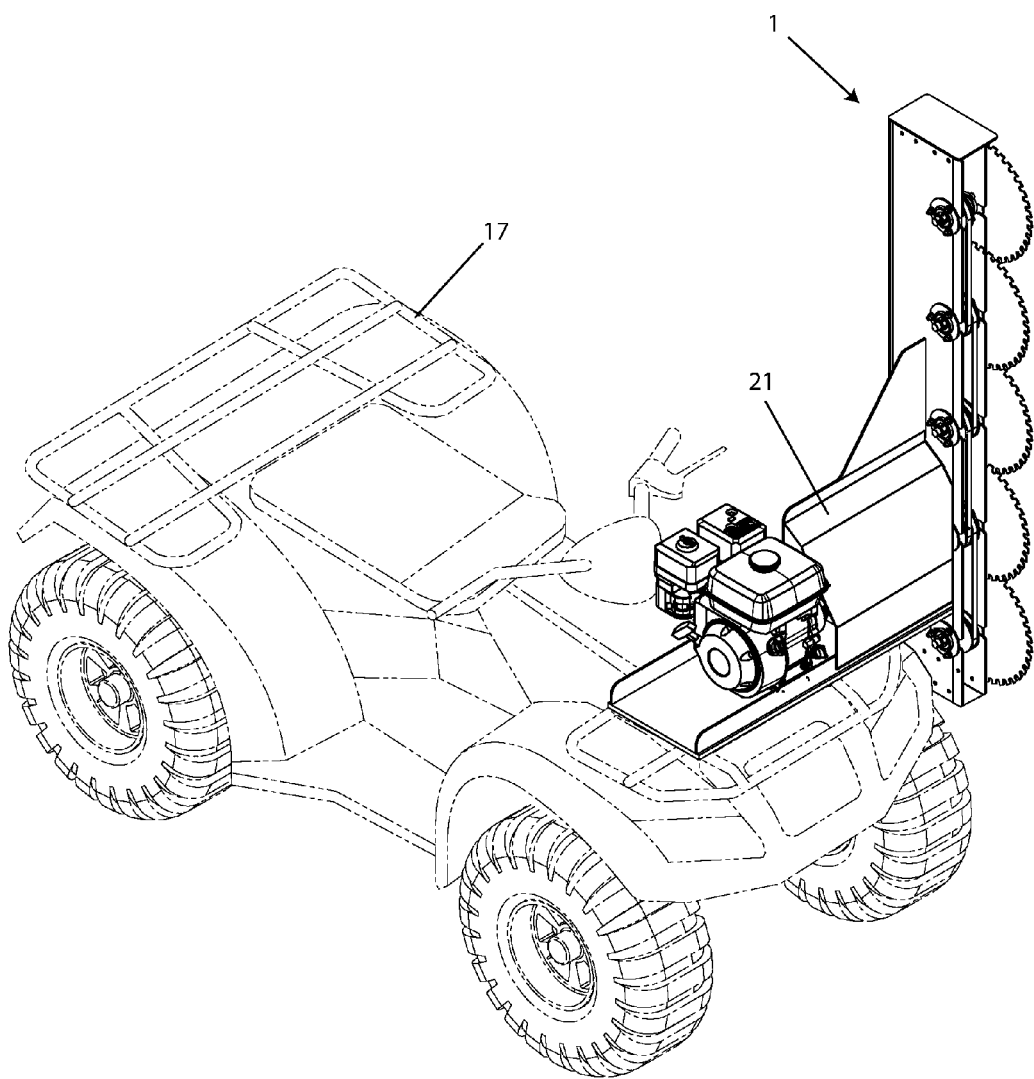
FIG. 9 is a front perspective view of an embodiment of the invention, showing the invention in use on an all-terrain vehicle.
Figure 10:
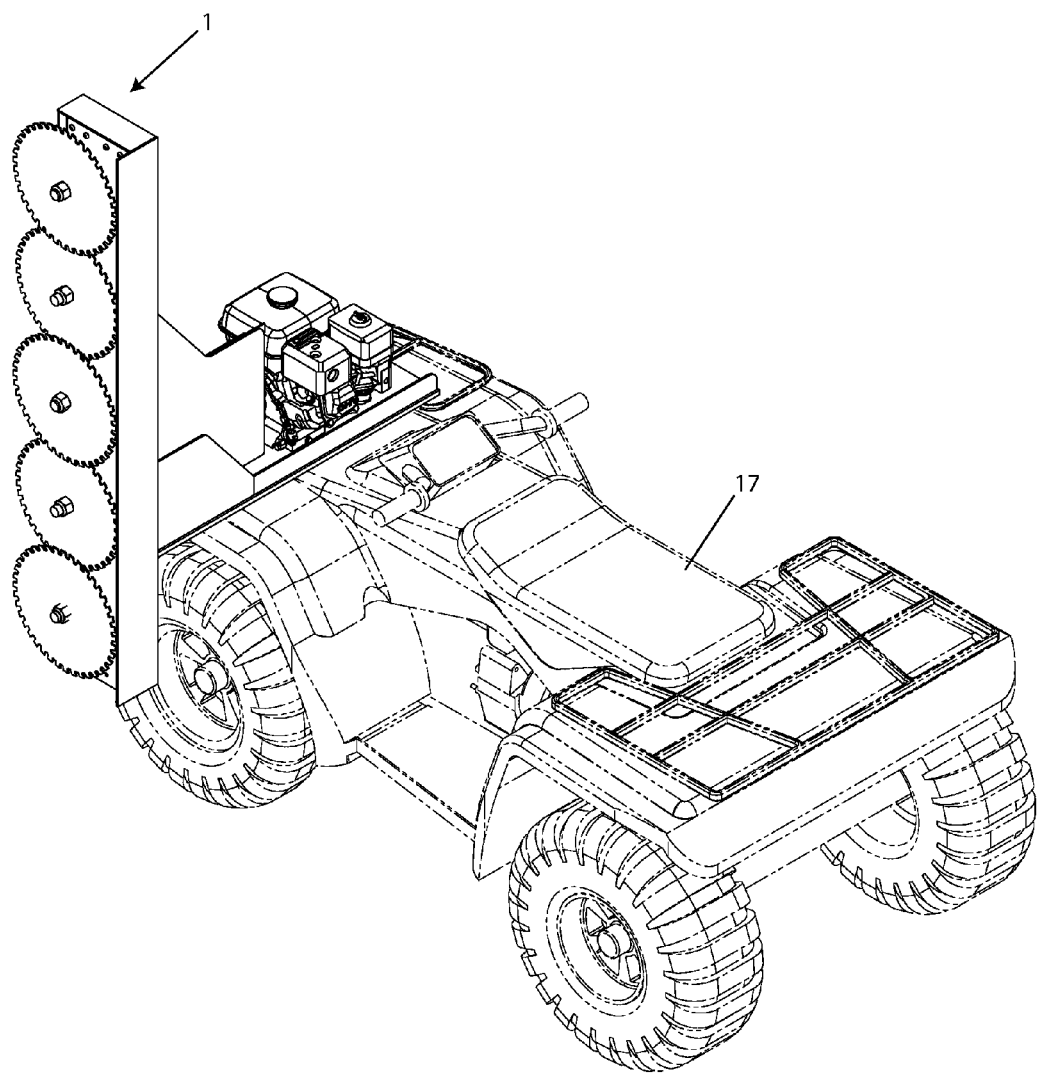
FIG. 10 is a rear perspective view of FIG. 9 thereof.
Figure 11:
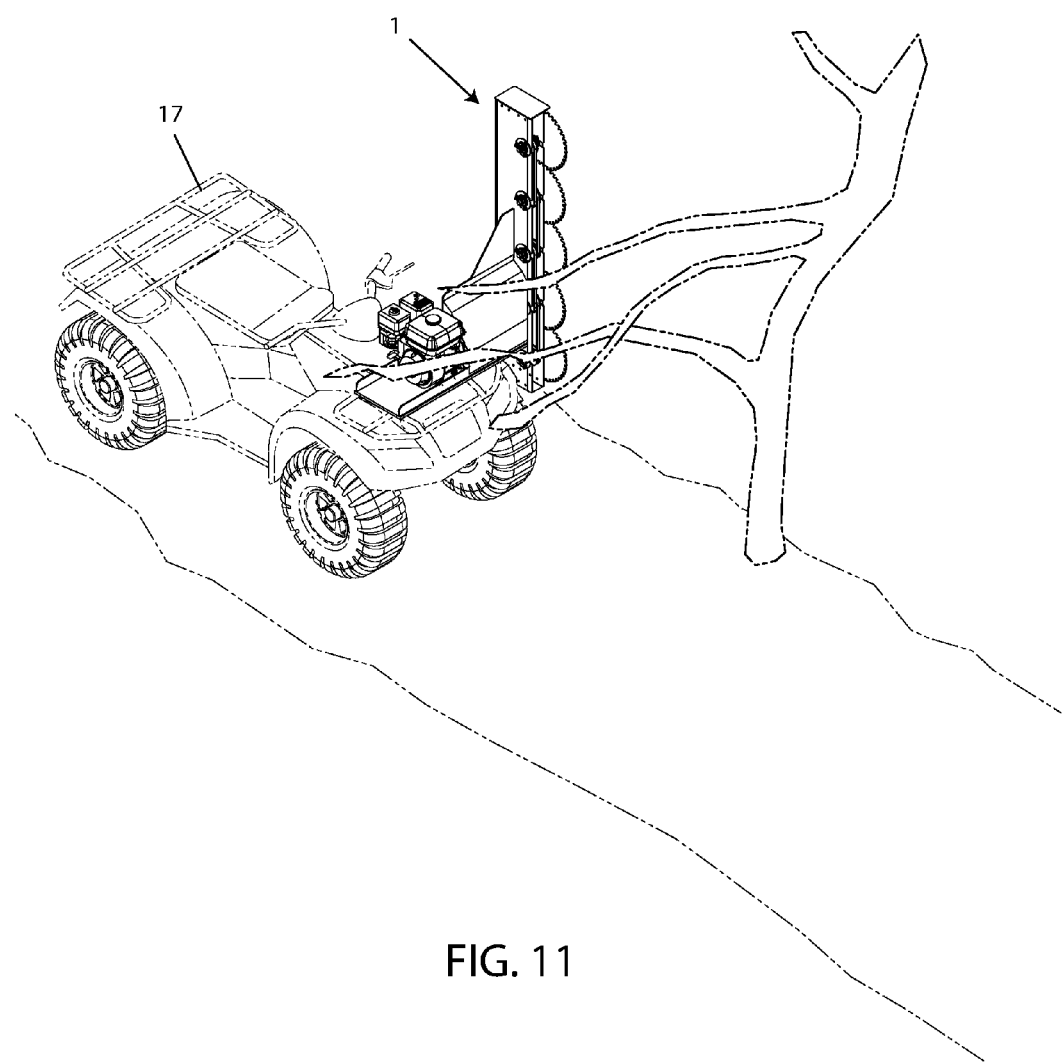
FIG. 11 is a perspective view of FIG. 9 thereof, showing the invention in use on an all-terrain vehicle travelling along a trail.
Figure 12:
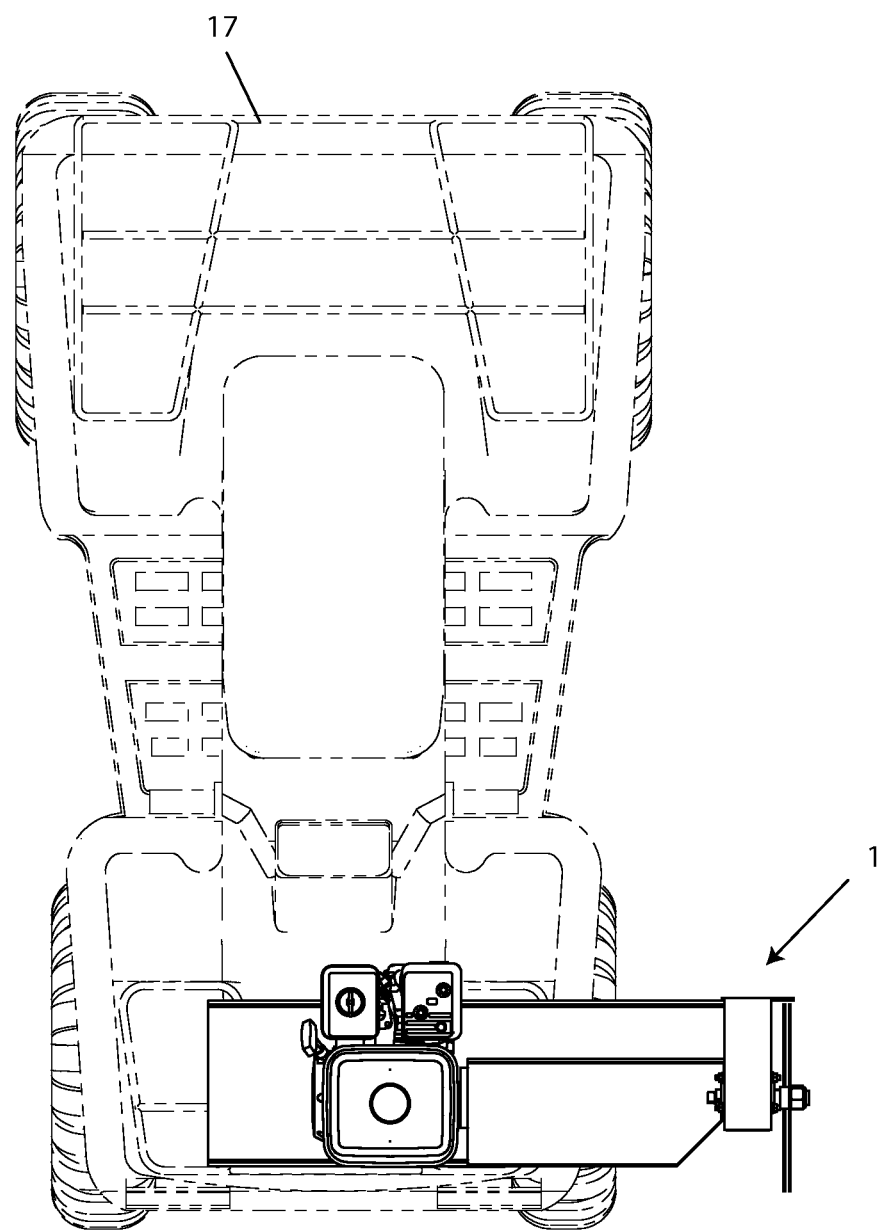
FIG. 12 is a top plan view of FIG. 9 thereof.
Figure 13:
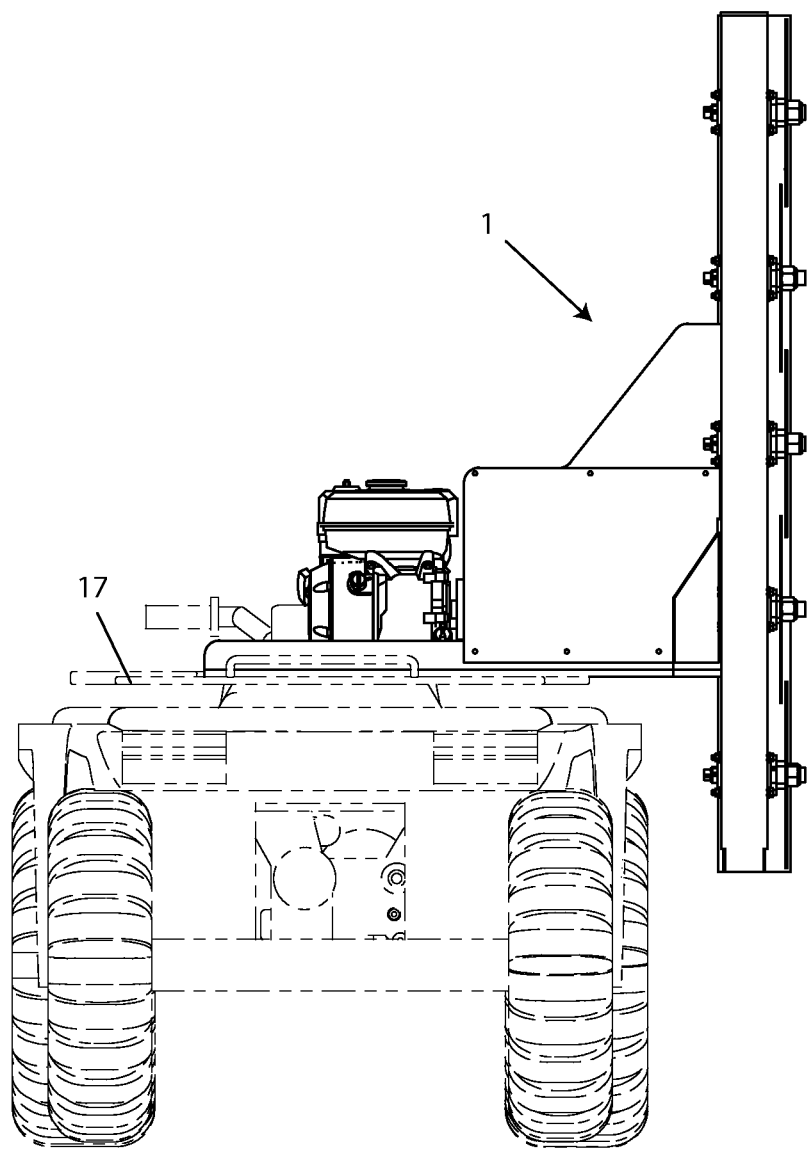
FIG. 13 is a front plan elevation view of FIG. 9 thereof.
Figure 14:
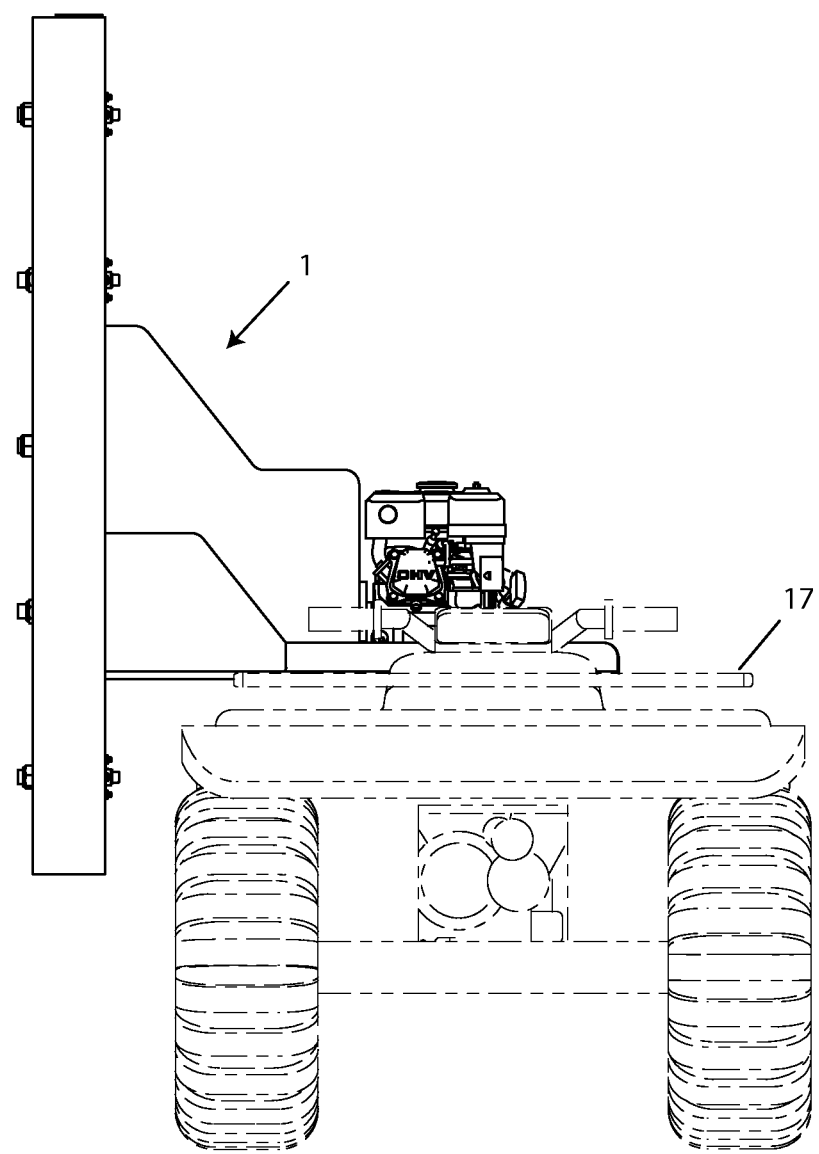
FIG. 14 is a rear plan elevation view of FIG. 9 thereof.
Figure 15:
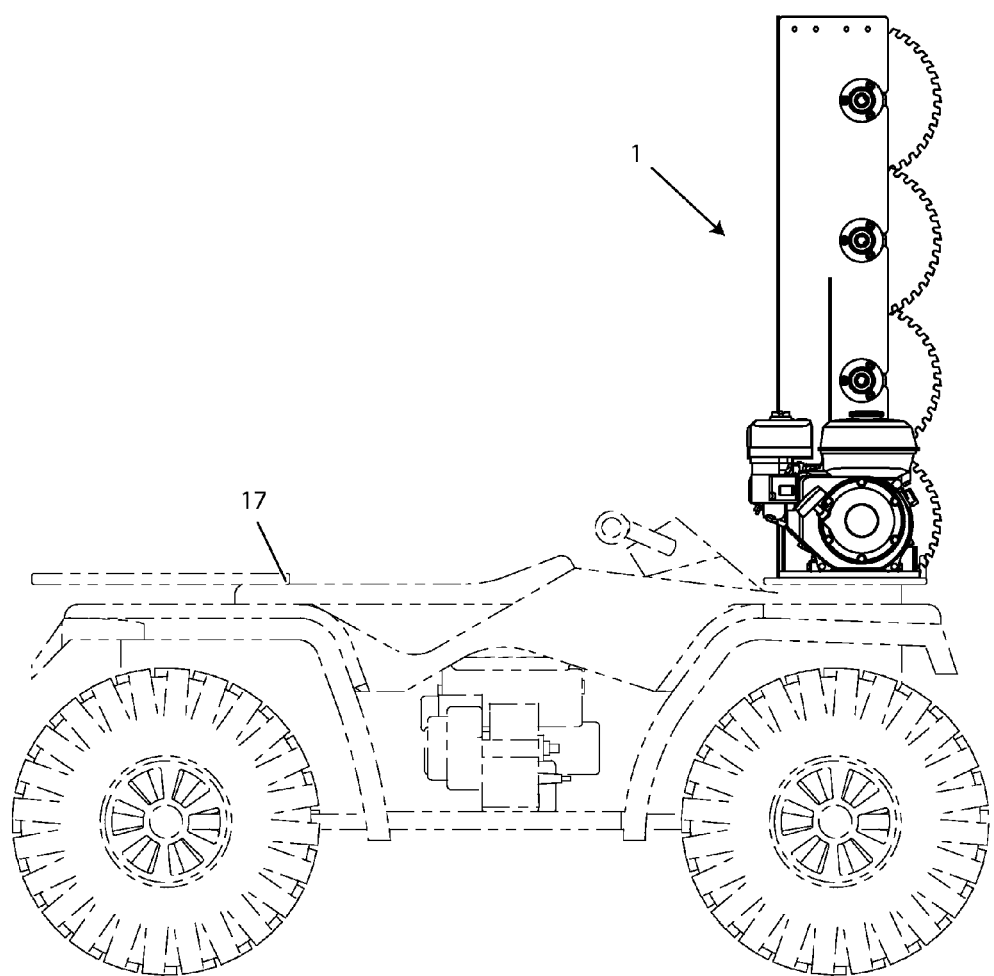
FIG. 15 is a left side elevation view of FIG. 9 thereof.
Figure 16:
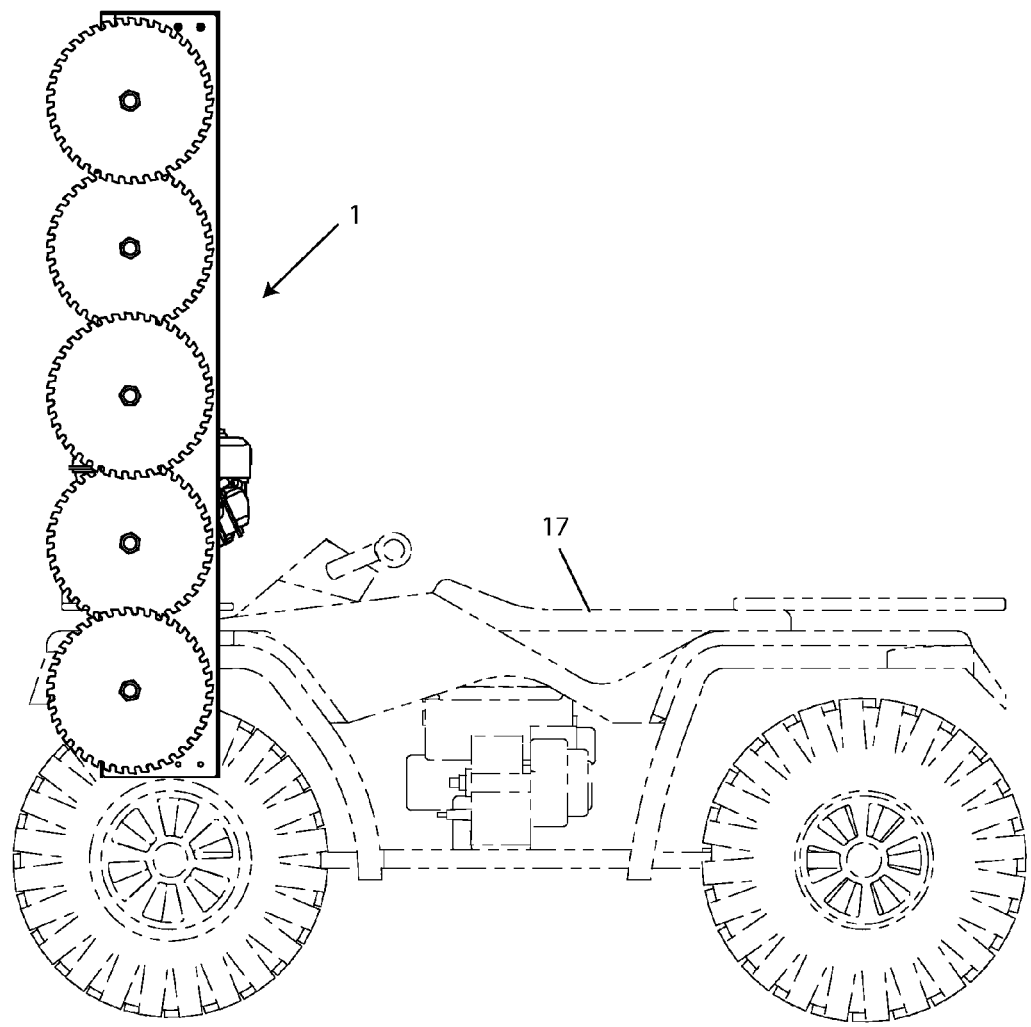
FIG. 16 is a right side elevation view of FIG. 9 thereof.
Figure 17:
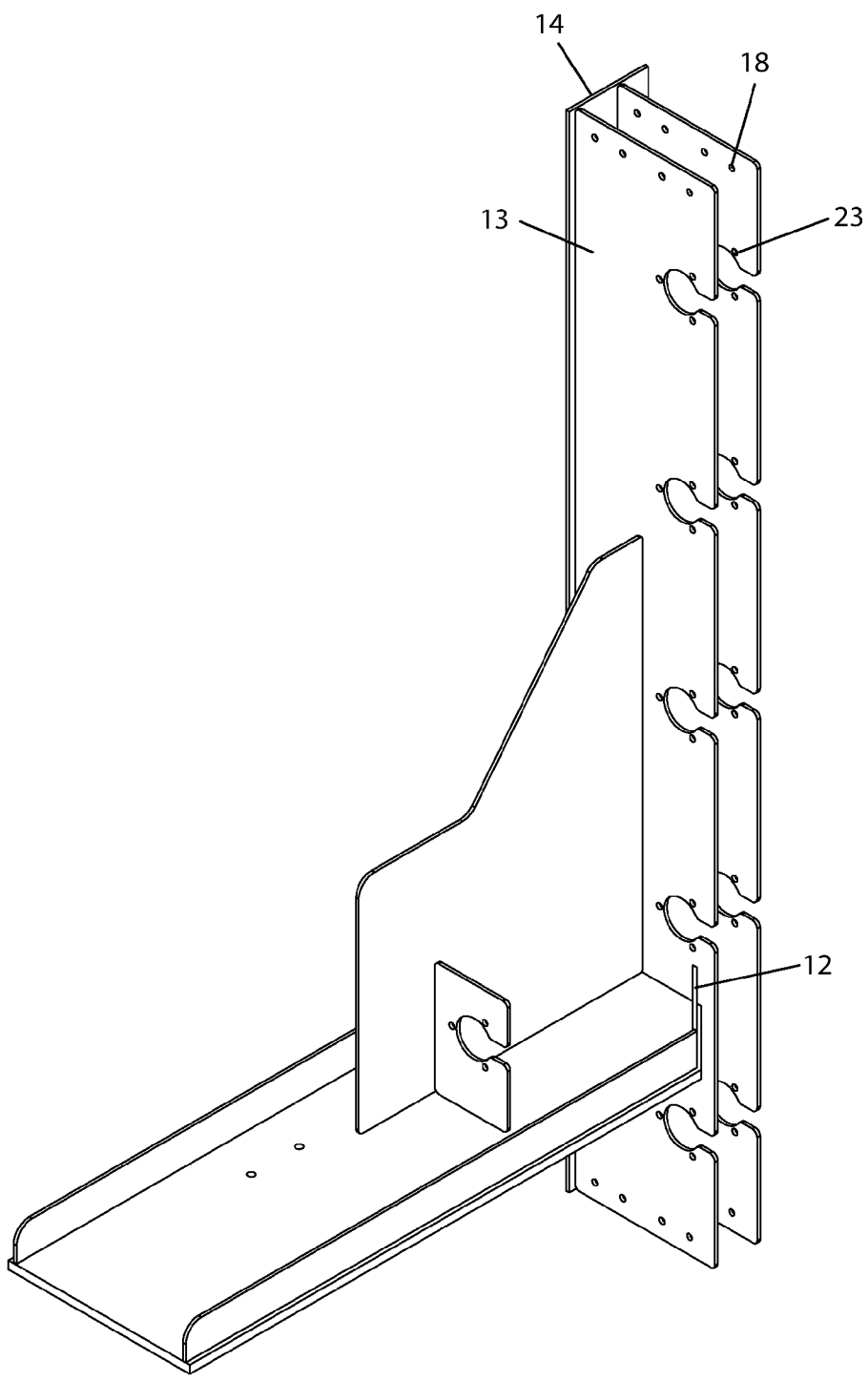
FIG. 17 is another perspective view showing the frame having a support platform and an upstanding mast member, with both the cutting assembly and powering means removed.
Figure 18:
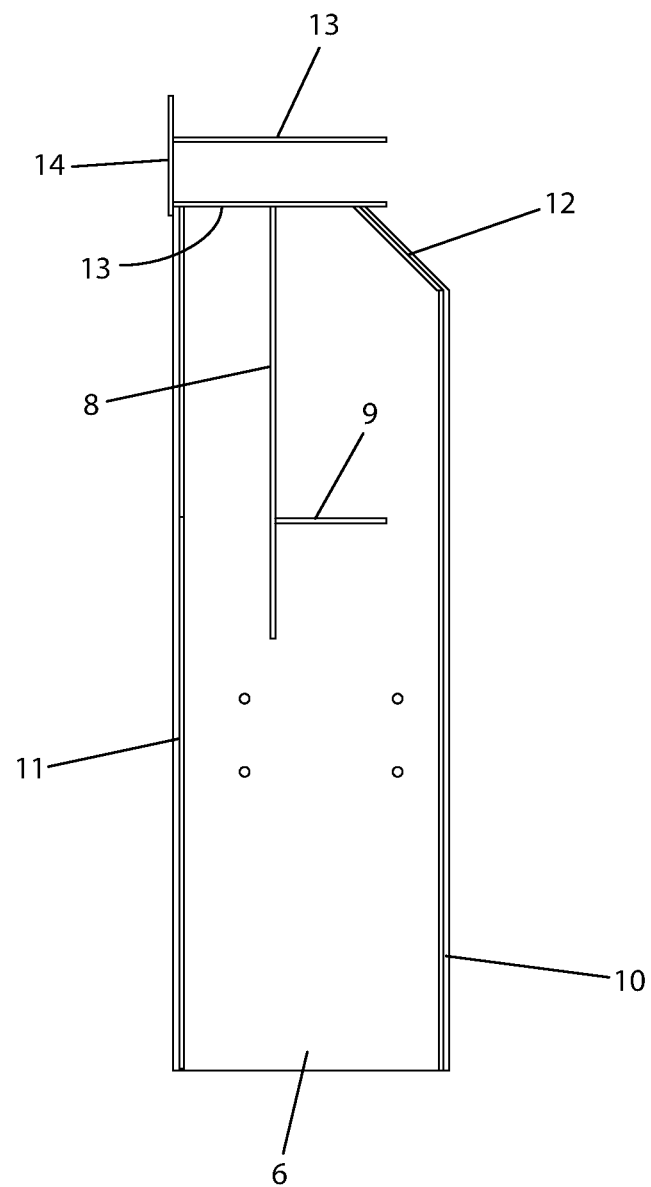
FIG. 18 is a top plan view of FIG. 17 thereof.
Figure 19:
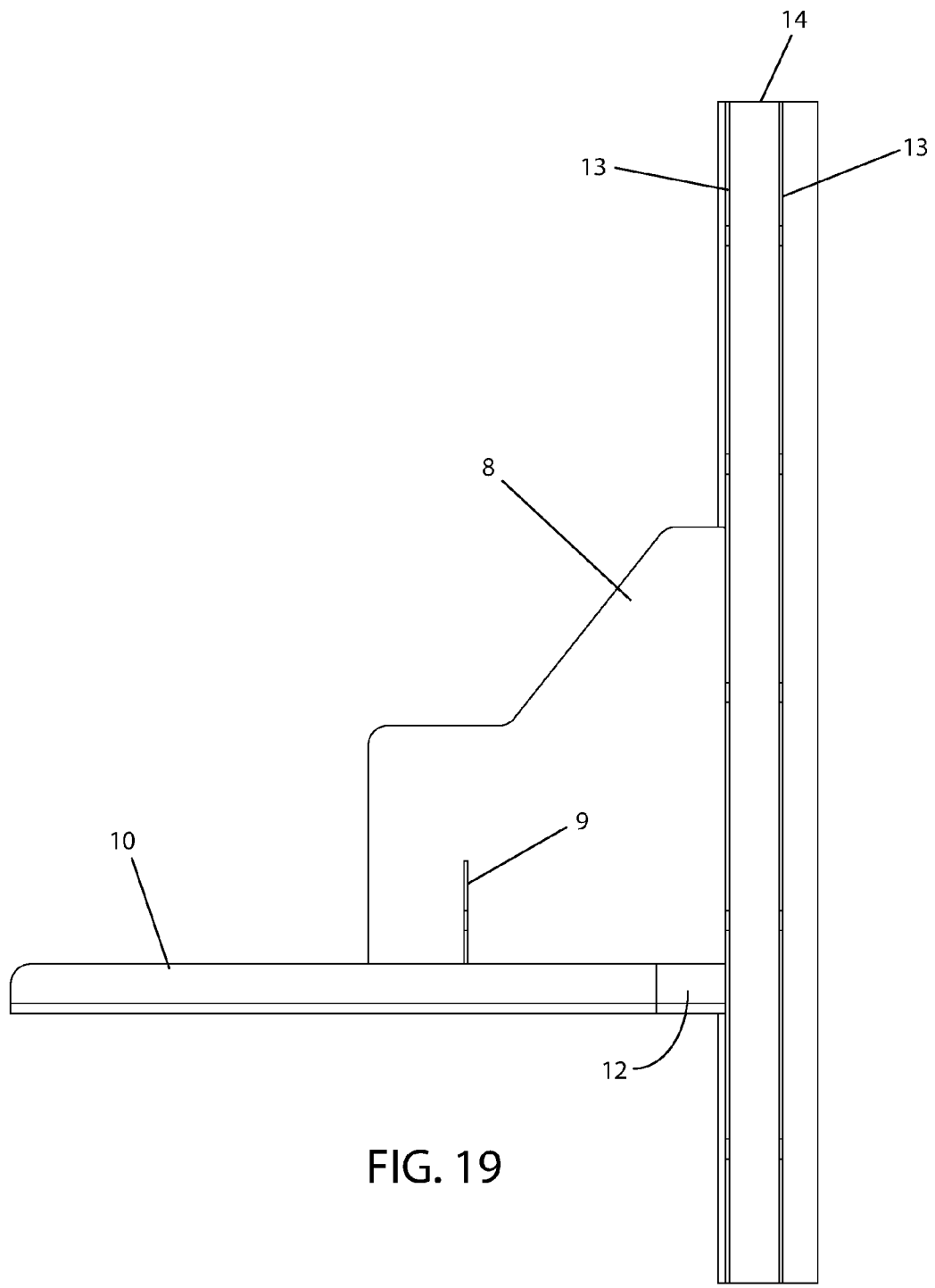
FIG. 19 is a front plan view of FIG. 17 thereof.
Figure 20:
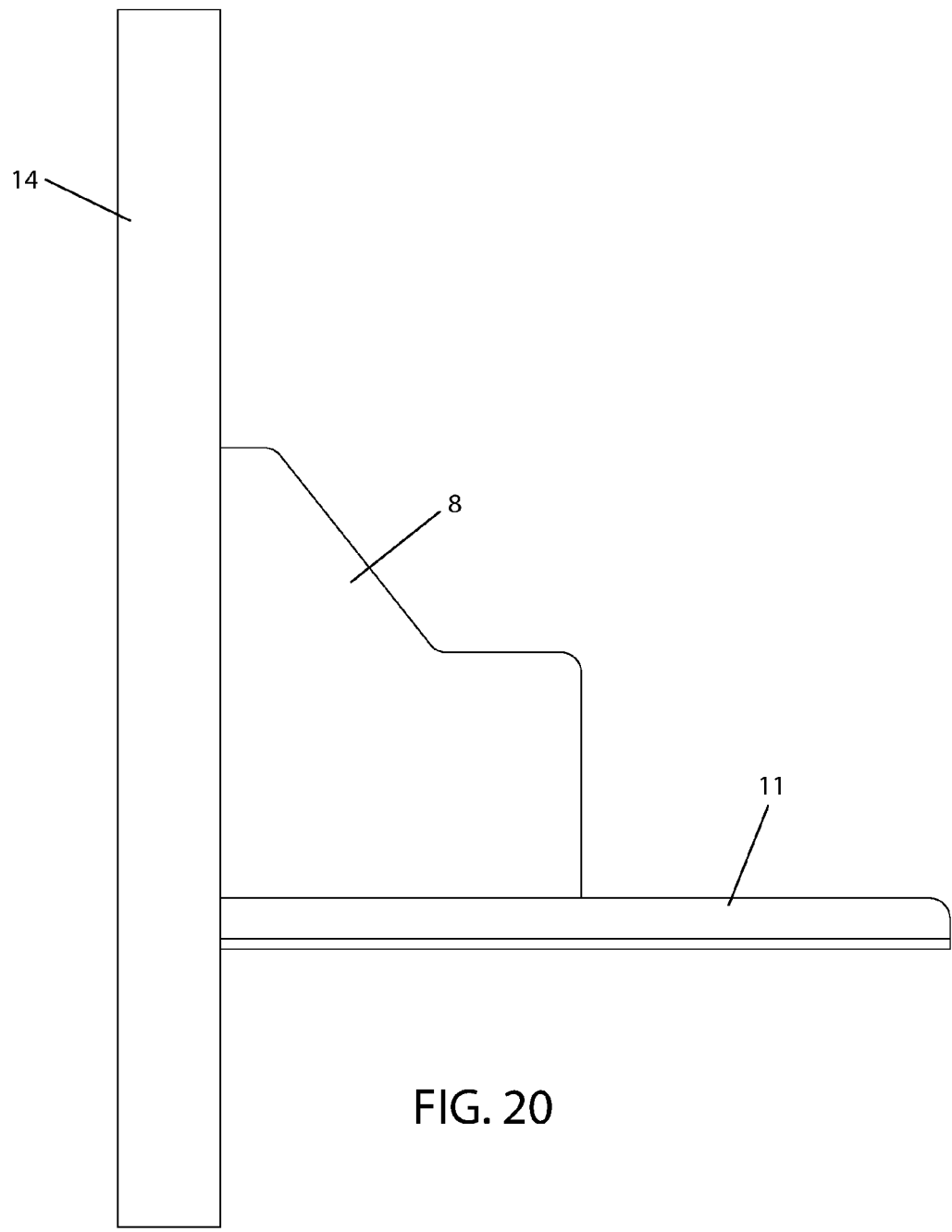
FIG. 20 is a rear plan view of FIG. 17 thereof.
Figure 21:
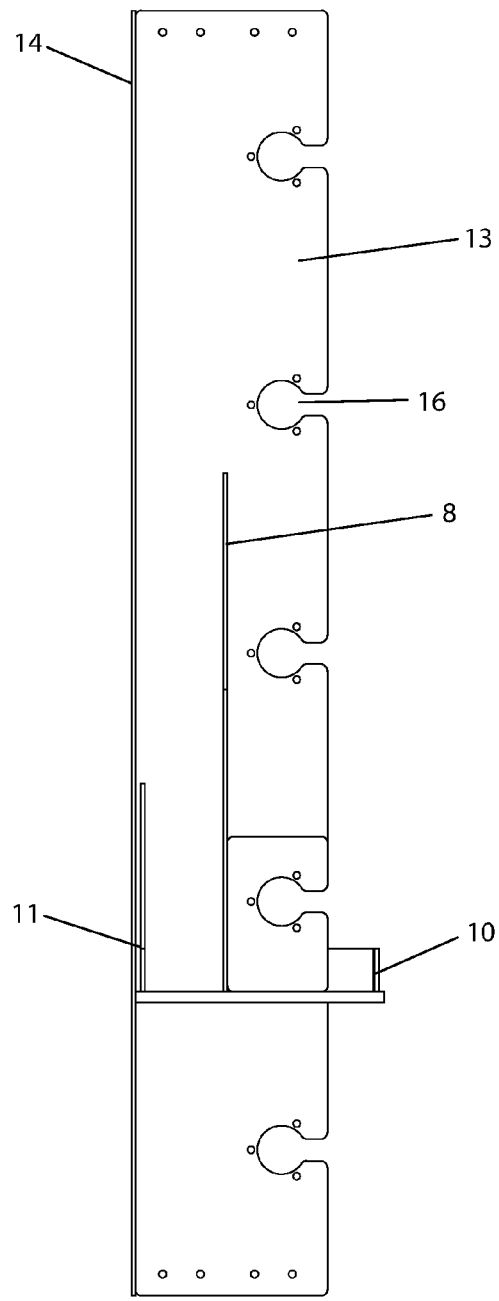
FIG. 21 is a left side elevation view of FIG. 17 thereof.
Figure 22:
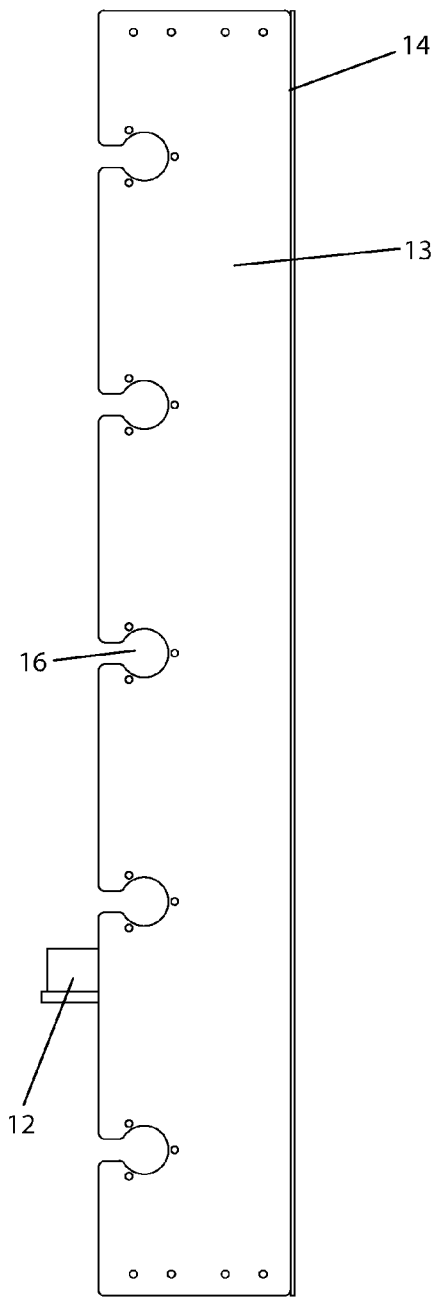
FIG. 22 is a right side elevation view of FIG. 17 thereof.
Figure 23:
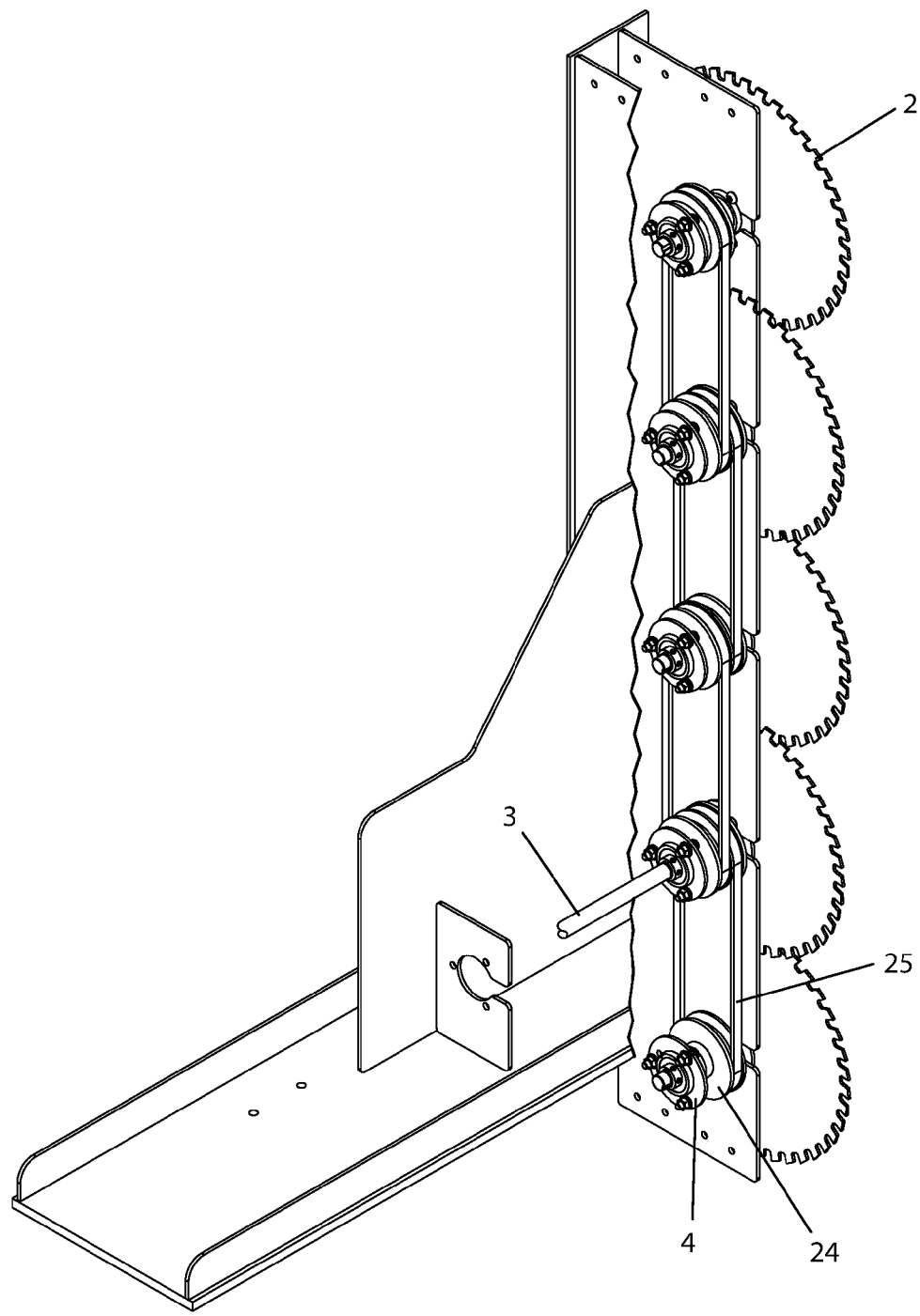
FIG. 23 is another perspective view of FIG. 17 thereof, with the cutting assembly installed.

The all-terrain vehicle is shown in broken lines and is not claimed as part of the design. The bottom plan views of the support platform and the mast member for the embodiments shown in FIGS. 9 and 17 are the same as FIG. 3, and therefore, are not depicted. The remaining views of the modular attachment member for the embodiment shown in FIG. 24 resemble the views of the cutting members and mast member of FIGS. 2-7, and therefore, are not depicted.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to, provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation, and construction possible. Likewise, when the plural form is used, it may be taken to include the singular form, and vice versa.

Referring more particularly to the drawing by characters of reference, FIGS. 1-23 depict a limb and branch trimming apparatus that is removably mountable to or on a vehicle, with the apparatus 1 comprising:

1. a cutting assembly comprising a plurality of cutting members 2, with each of the cutting members having a fastening mechanism;

2. a drive assembly coupled to a main drive shaft member 3 and a plurality of slave shaft members 4, with the main drive shaft member 3 being coupled to both a power source 5 and to at least one of the cutting members 2 for rotatably driving the cutting members;

3. the power source 5 for powering both the drive assembly and the cutting assembly independently from a vehicle's powering means; and 4. a frame comprising, a support platform 6 and an upstanding mast member 7, with the support platform 6 having an upstanding brace 8, an upstanding shaft support plate 9, two shoulders 10, 11, and a corner plate 12, with the mast member having two opposing side walls 13, a rear wall 14, and a top plate 15, with each of the side walls defining a plurality of bores 16 for receiving each fastening mechanism of the cutting members 2.

The frame of the apparatus has a support platform and an upstanding mast member (or boom arm). The frame, namely, the support platform, is removably mountable to or on a vehicle, while the mast member extends over the forward side of the vehicle. The vehicle 17 may have a hood or a front rack to which the support platform is installed. As shown in FIGS. 9-16, the support platform is preferably mounted on, or coupled to, the top of the front of the vehicle. The support platform may be secured to vehicle with fasteners at or to the hood or the front rack of the vehicle. No structural changes to the vehicle are needed when mounting the support platform. The frame and the structural components are preferably made from a flat lightweight metal, namely, aluminum. Aluminum is preferred for use on lightweight vehicles, for example, on an all-terrain vehicle. In one embodiment, the flat metal is made from aircraft aluminum for example, 6061-T6, with the flat metal being fabricated into the various component configurations. The support platform and the mast member are preferably formed as a single unit that is welded or otherwise affixed together.

As shown in the figures, the support platform has a base 6 (or a bottom), an upstanding brace 8, two shoulders 10, 11 (or vertical stiffeners), a corner plate 12 and an upstanding shaft support plate 9. As shown in FIGS. 9-16, the support platform is positioned preferably perpendicular to the vehicle 17 with the proximal first end of the support platform extending over the side of the vehicle to support the mast member. The proximal end of the support platform 6 is the area closest to the mast member 7 and the cutting assembly. The distal second end of the support platform 6 is the area closest to the power source 5. Each of the shoulders is affixed along the length of the base of the support platform. The shoulders provide vertical strength to the apparatus to prevent flexing movement of the structural components.

Figure 8:
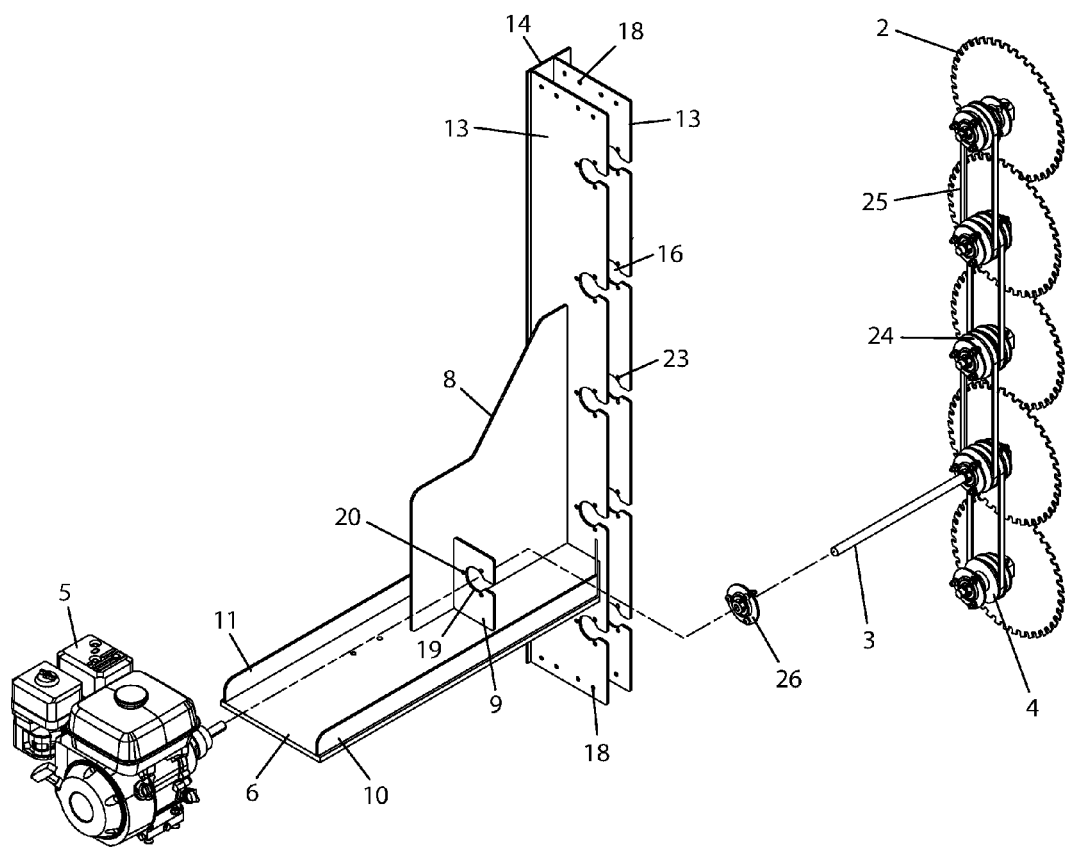
FIG. 8 is an exploded perspective view of FIG. 1 thereof.

The bottom or base of the support platform is installed preferably over the front of the vehicle. FIGS. 8 and 17 show that the base of the support platform has a plurality of apertures for receiving one of a plurality of fasteners for securing the power source to the support platform. The brace, the support plate the corner plate, and the shoulders are each upstanding from the base, with each of these structures being secured to the base by welding, affixing, or otherwise bending the metal parts into the appropriate configuration. In a preferred embodiment, the base is a ½ inch×12 inch aluminum plate. If the support plate had a substantially rectangular or square structure rather than a corner plate, the structure would impede limbs from being pushed toward the blades. The apertures may be arranged into columns and rows. Preferably, the apertures are arranged into two columns and two rows. The two columns may have a distance of approximately 6.378 inches. The two rows have a distance of approximately 3.051 inches. The fasteners for removably securing the base to the vehicle are preferably standard Grade 5 hex head fasteners.

The brace 8 of the support platform is essentially a plate upstanding from the base 6 of the support platform. The brace is located near the proximal area of the support platform base. The brace 8 provides support to the mast member 7. The brace is preferably substantially parallel to the shoulders 10, 11. In one embodiment shown in FIGS. 17 and 19, the top of the brace extends laterally from the proximal area of the brace, then extends downwardly then further extends laterally toward the distal area of the brace. The brace may be fabricated from an aluminum plate that is cut into the appropriate configuration. The design of the brace eliminates excess weight off the brace.

The shaft support plate 9 of the support platform is an upstanding plate that abuts the base 6 and the brace 8. Preferably, the shaft support plate 9 defines a bore 19 for receiving a main drive shaft member 3. The shaft support plate 9 also defines a plurality of apertures 20 or holes. The shaft support plate apertures essentially form a ring around the bore. The support plate is used to stabilize the power transmitting drive shaft member.

The two shoulders 10, 11 (or stiffeners) are parallel or lengthwise along the sides of the support platform 6. In one embodiment as shown in the figures, the first forward shoulder 10 is located at the front of the support platform 6. This forward shoulder may be offset a few inches from the lateral forward edge of the support platform. A second rear shoulder 11 is located at or near the lateral rear edge of the support platform 6. A purpose of the shoulders is to support the support platform and the mast member. Alternatively, when only one shoulder is used, the shoulder is located and mounted to form a T-section of the machine frame. In a preferred embodiment shown in FIG. 5, the rear or second shoulder 11 closest to the driver has an upper portion that is thicker than the lower portion for use as a vertical stiffener.

Figure 1:
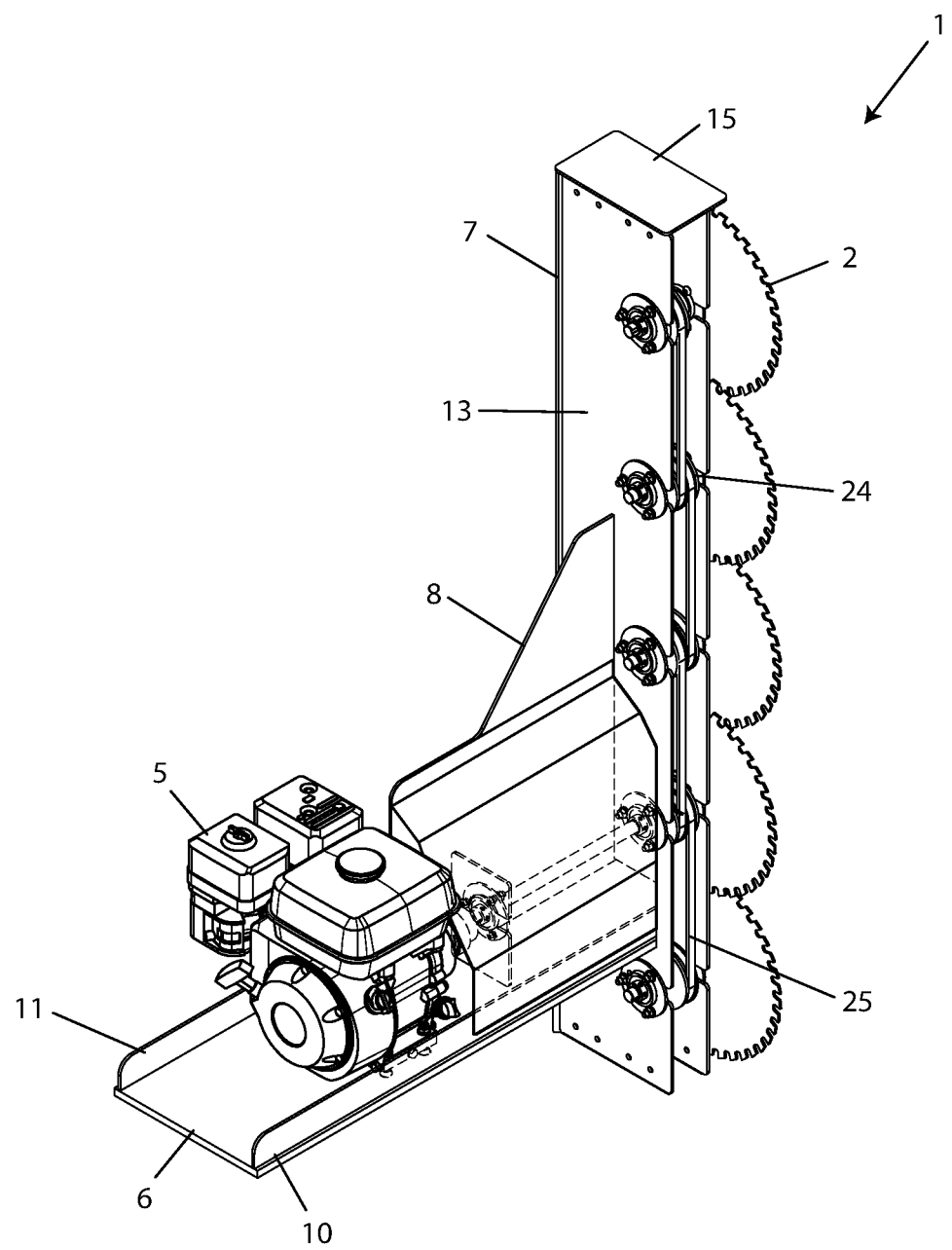
FIG. 1 is a perspective view of an embodiment of the invention.
Figure 2:
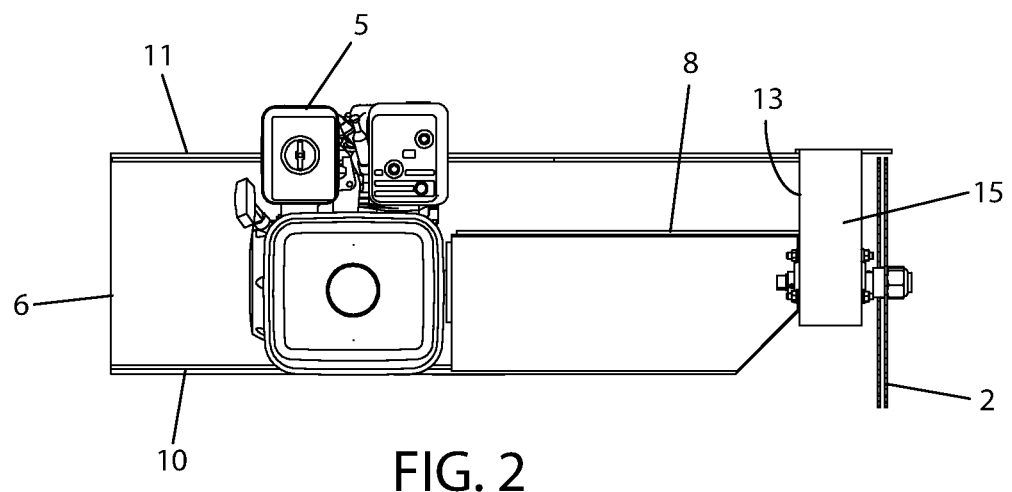
FIG. 2 is a top plan view of FIG. 1 thereof.

FIGS. 1 and 9 show another embodiment of the apparatus. Here, the apparatus further includes a first shaft cover 21 and a second shaft cover 22. The first shaft cover 21 is detachable from the brace 8. The first shaft cover acts as a cover or a guard so that limb debris slides off. The shaft, cover also provides safety to the operator. The cover has fasteners, such as bolts, at the top and at the bottom of the shoulder. The second shaft cover 22 is essentially a front wall. The front wall is removable to prevent limb debris from hitting the pulley system. The front wall is bolted to the forward sections side walls.

Figure 3:
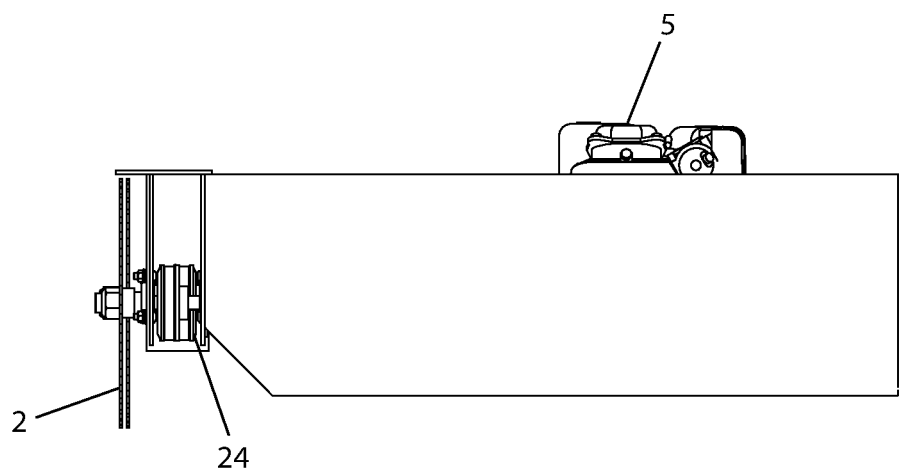
FIG. 3 is a bottom plan view of FIG. 1 thereof.
Figure 4:
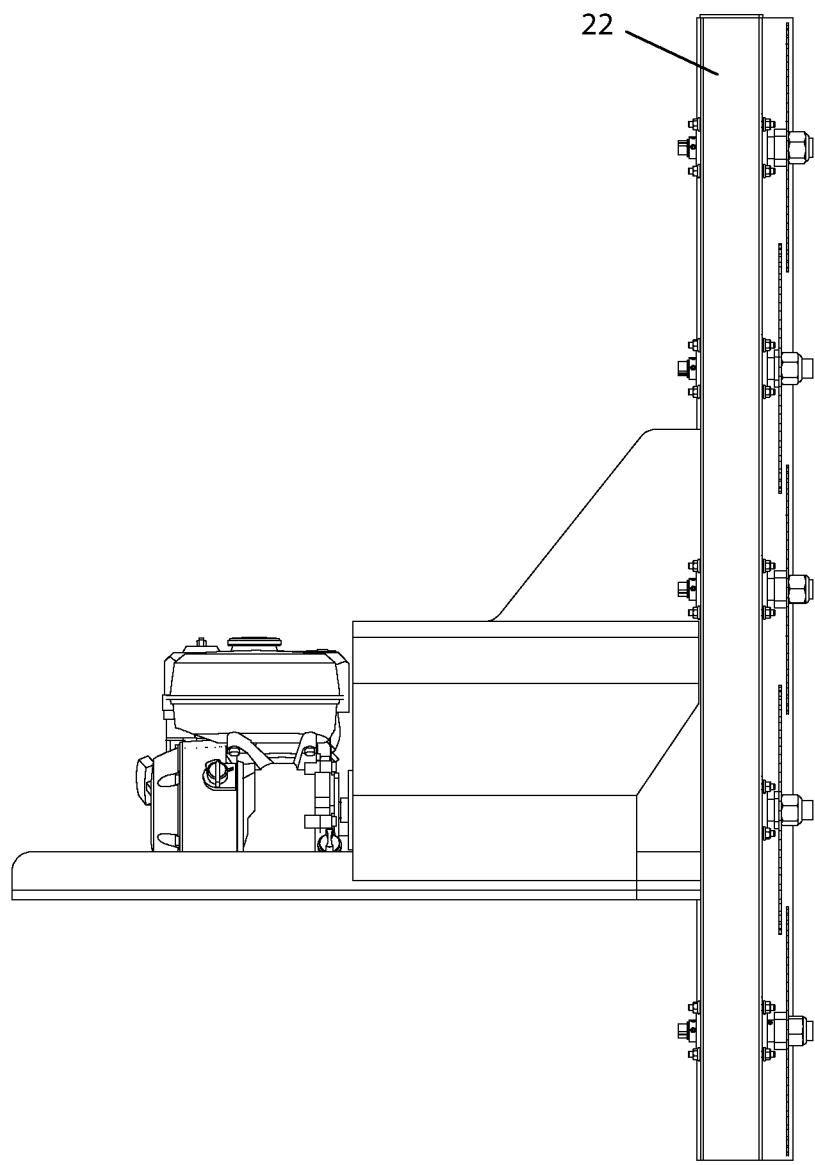
FIG. 4 is a front elevation view of FIG. 1 thereof.
Figure 5:
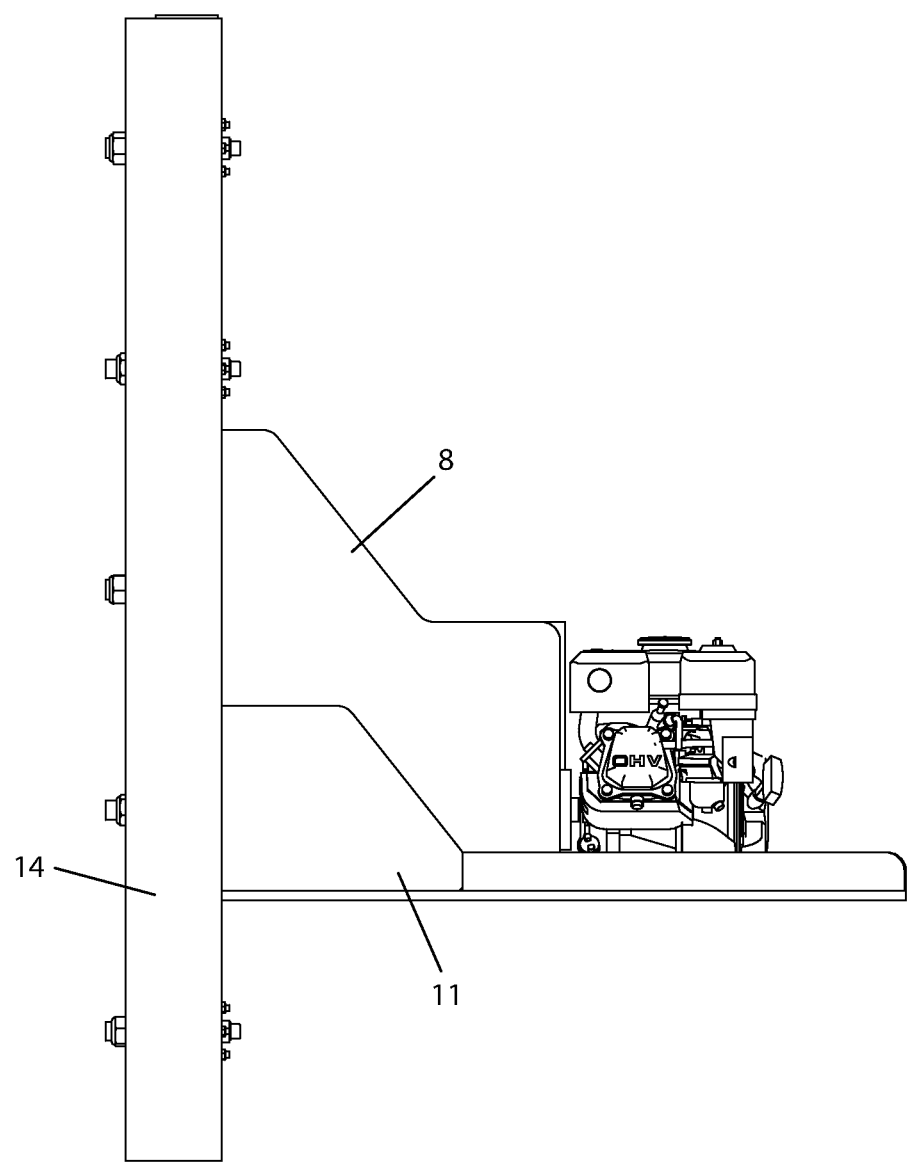
FIG. 5 is a rear elevation view of FIG. 1 thereof.
Figures 6, 7:
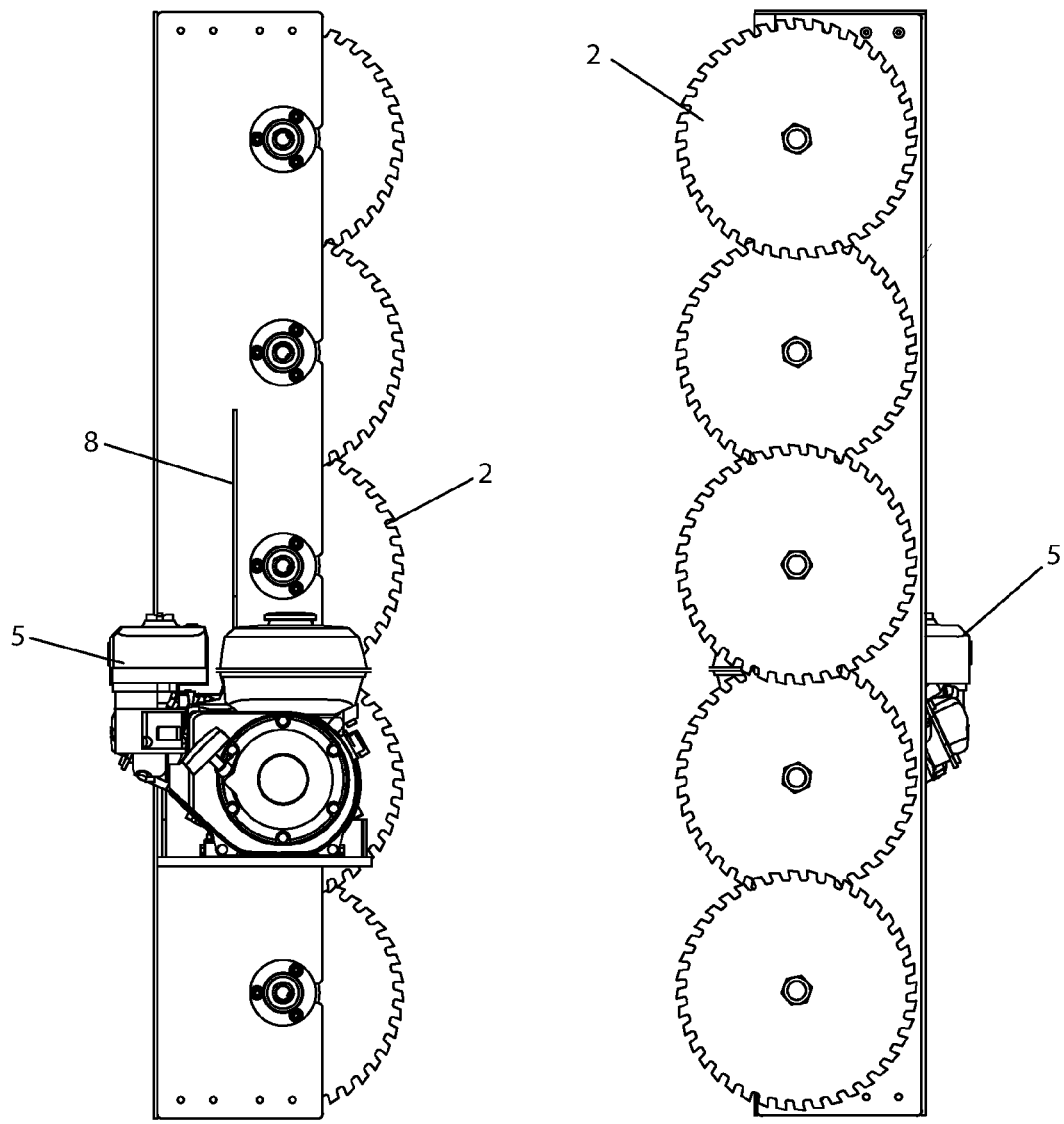
FIG. 6 is a left side elevation view of FIG. 1 thereof.
FIG. 7 is a right side elevation view of FIG. 1 thereof.

In FIG. 3, the corner plate 12 of the support platform 6 is upstanding from the base 6. The Corner plate 12 is affixed to or otherwise connected to the forward first shoulder 10. The corner plate may also be made from aluminum, and is cut to the desired configuration. The corner plate is used to vertically strengthen the support platform base 6 and the mast member 7. The corner plate abuts the mast member. Alternatively, the corner plate may be integrated with the forward shoulder and bent at an angle. Also the location and size of the corner aids in decreasing the weight of the frame.

The support platform may further have a clamping means for clamping the bottom of the support platform to the vehicle (not shown). In an embodiment, the clamping means includes at least one bar member or a clamp member underneath the bottom of the support plate. The vehicle, namely an all-terrain vehicle, usually has a front rack. The support plate and clamp member sandwiches the support platform to the vehicle front rack. The clamp member is secured with fasteners such as bolts, through the holes at the bottom of the support platform base. The clamp member may also be made from flat metal. The clamp member may be approximately four inches wide and is arranged substantially perpendicularly to vehicle front rack, with a first clamp member positioned at the front of the support platform, and a second clamp member positioned at the back of the support platform.

The substantially upstanding or vertical mast member 7 is essentially an upstanding boom arm or mounting member that supports the plurality of cutting members 2. The mast member 7 abuts and is affixed to the support platform 6. More particularly, the mast member 7 abuts and is affixed to the proximal first end of the brace 8 and the proximal end of the base of the support platform 6. The mast member may be affixed to the support platform by welding or bolting. The mast member 7 has two side walls 13, a rear wall 14, and a removable front wall 22. Alternatively, the mast member is a unitary member with the side walls and the rear wall formed from a single piece of metal. The mast member may further include a top plate 15 for additional stability of the mast member. The mast member is also made from aluminum that is cut into the appropriate configuration. In another embodiment (not shown), the mast member has only one side wall, and a rear wall, with the side wall supporting the plurality of cutting members. In an embodiment, the two side walls of the mast member may be approximately 3/16 inch thick×10 inches wide×9 1/16 inches long. The rear wall of the boom arm may be approximately 3/16 inches thick×5 inches×4 feet 11/12 inches long. The top plate may be approximately 3/16 inches×5 inches×9 1/16 inches.

The two opposing side walls 13 of the mast member 7 form a channel. Each side wall 13 is essentially an upstanding wall that has a plurality of spaced apart openings 16 or bores for receiving one of the plurality of cutting members 2. Each side wall may further have a plurality of sets of apertures 23 for receiving fasteners from the cutting assembly. In a preferred embodiment, each bore has a neck opening that expands into a larger circular opening. The bore 16 receives the slave shaft member 4 from the cutting assembly. As shown in FIGS. 17-22, each bore of the first side wall aligns with each of the bores of the opposite second side wall. The perpendicular slave shaft members also provide structural support to the upstanding side walls. The rearward end of each side wall 13 abuts the rear wall 14. The upper end of each side wall 13 abuts the bottom of the top plate 15. The circular saw blades 2 are located along the outer side wall 13 closest to the tree limbs to be cut. The outer portion of the first side wall closest to the driver is used as a shield or guard to prevent small debris from hitting the driver. In one embodiment, at least one of the side walls, preferably the outer first side wall, is offset a few inches away from the edge of the rear wall to accommodate the location of the cutting members. The rear portion of the cutting member is also covered with the rear wall so that the debris is thrown downwardly and outwardly. The inner second side wall may be positioned at or near the edge of the rear wall. The upper and lower sections of each of the side walls may further have a plurality of spaced apertures 18 for coupling to a modular attachment member 27 or to a top plate 15

The rear wall 14 of the mast member 7 is essentially an elongated metal plate used as structural support of the mast member and for use as a shield. Due to the length of the rear wall, the driver's legs are protected from debris. The top plate 15 of the mast member 7 may be coupled to the top of the two side walls 13 and the rear wall 14. The top plate is a metal plate that may overlap or overhang the inner side wall. Alternatively, the side walls may be coupled to the top plate and the rear wall by welding or bolting. The top plate prevents limb debris from falling inside the mast, member channel. In an embodiment, the top plate (or cap) is removable. The front wall 22 of the mast member 7 is attachable to the front ends of the side wall 13 to further enclose the side wall channel and the pulley system therein.

The cutting assembly has a plurality of cutting members and a rotating means for rotating each cutting member. In a preferred embodiment, the cutting assembly has a plurality of cutting members, a pulley system for rotating the cutting member, and a fastening mechanism for rotatably fastening the cutting members to, one of the bores in the side walls.

The cutting members 2 are preferably circular saw blades, with each of the blades having a plurality of spaced apart teeth, and with the blades defining a substantially central bore for rotatably engaging with the fastening mechanism. The plurality of circular saw blades may be arranged in a spaced apart overlapping linear arrangement to improve the cutting efficiency of the apparatus. Each of the cutting members is positioned at the outer face of the side wall nearest the trail for easy access to overhanging limbs. The figures show the blades being preferably staggered and overlapping from front to back. The blades are preferably 11½ inch center, 13 inch diameter, with a 1½ inch overlap from blade to blade. To create the overlap, the blades use first spacers and thicker second spacers, each with different tightening fastening mechanisms. The fastening mechanism may include a threaded locknut that is pinned into place to prevent blade loss.

The rotating means is essentially a drive assembly that has a main drive shaft member 3, a plurality of slave shaft members 4, and a pulley system 24. One of each of the slave shaft members 4 is inserted through each one of the side wall bores 16 and the circular saw blade holes or bores, then secured with the fastening mechanism. Each of the plurality of slave shaft members cooperates as each respective cutting member axle for the pulley belts 25 to spin on. The cutting member that is on the same plane as the engine and the support platform utilizes the main drive shaft support member as its axle.

The pulley system has a plurality of A-type v-groove pulleys 24 and a plurality of V-belts 25. The pulley system cooperates with the fastening mechanism, and the powering means to rotate the plurality of cutting members. More particularly, each pulley 24 transmits power from the belt 25 to the individual slave shaft member 4 for each cutting member 2. In, a preferred embodiment, five pulleys are used, with each pulley being positioned at the rearward side of each cutting member.

The pulley assembly has a plurality of groove pulleys. The figures show the uppermost and lowermost pulleys have two circular rings circumscribing slave shaft members, with each of these pulleys supporting a single belt that travels within the pulley groove. The inner three pulleys are double stacked with two pulley grooves for holding two belts. All of the grooves should be the same diameter so that the blades rotate at the same speed. Each V-belt, preferably four of the V-belts, transmits power from the slave shaft members to another slave shaft member. The belts are also designed to slip if the cutting members get into a bind caused by the operator attempting to cut limbs or brush that are too large, and to prevent damage, to the apparatus. A V-belt is preferred over a chain and sprocket because a chain and sprocket will not slip during a bind or a jam. The V-belt used is preferred over a gear belt because a gear belt will not slip during a bind.

The powering means has a power source and a drive assembly for providing power to the cutting assembly. The power source is preferably an internal combustion engine 5 or motor run by gasoline or diesel. The power source is operable independently from the vehicle's engine or power source. Therefore, the apparatus' power source can power the cutting assembly and the drive assembly, regardless of whether the vehicle's own motor is running or whether the vehicle is moving. The internal combustion engine (or motor) is activated using conventional methods. Using gasoline or diesel increases the portability and longevity of the engine assembly, particularly when trimming miles of trails without needing to recharge a battery. The engine is removably mounted to the base of the support platform with fasteners. Preferably, the engine assembly is positioned, at the distal area of the support platform. The support platform is strong enough to support the weight of the engine over the vehicle. Another benefit for having the engine located near the distal area of the support platform is that the engine is positioned near the driver of the vehicle for easy access. The engine's pull start/top control member is near the driver's hands while the exhaust emission from the engine is dispersed out the front of the engine. When the engine is positioned more toward the middle of the support platform, the location provides for additional space so that a battery can be installed near the engine if an electric start is added to the engine. In an embodiment (not shown), the engine may have a base and a square flange, with the base defining a plurality of holes for countersinking bolts to secure the engine to the support platform.

The drive assembly has a main drive shaft member and the rotating means for rotating the cutting members. The drive assembly may further include a centrifugal clutch, a linear alignment coupling, and a plurality of shaft support bearings. The main drive shaft member is essentially an elongated tubular rod having a threaded end. The distal second end of the main drive shaft member closest to the engine is rotatable mounted to the engine, and is inserted through the centrifugal clutch and the linear alignment coupling. The centrifugal clutch slips if the cutting members get into a bind and jam during attempts to cut limbs or branches that are too large. The slip clutch spins with a spring loaded weight. The centrifugal clutch decouples the engine from engine and the main drive shaft member, allowing the engine to start without a load. This feature allows the engine to idle without turning the blades. Once the engine throttle is increased, the clutch engages and causes the blades to spin. If the belt slips, the blades have a circular hole on the shaft so that friction makes them spin. If one blade binds, then the other blades will keep spinning. The linear alignment coupling corrects any misalignment of the engine and the main drive shaft member.

The distal second end of the main drive shaft member 3 may also include one of the shaft support bearings 26 to, support the main drive shaft member 3 near the engine 5. The main drive shaft member transmits power from the engine to the pulley system. The proximal first end of the main drive shaft member closest to the mast member has one of the shaft support bearings. The proximal shaft support bearing supports the main drive shaft member and the plurality of slave shaft members. The proximal end of the main drive shaft member is connected to one of the cutting members, and is inserted through each side wall bore and the cutting member bore. Preferably, eleven shaft support bearings are used, with two per blade shaft. The bearings allow the shafts to rotate and to hold the blades in place vertically. In one embodiment, the proximal end of the main drive shaft member has an enlarged threaded end.

The main drive shaft has a first threaded end, a groove or keyway for pulley engagement with the pulley, and a snap ring to keep the shaft in place to prevent axial movement. The main drive shaft may further include an extension rod. A groove or keyway is located at the distal end of the main drive shaft closest to the power source to receive the coupling.

Figure 24:
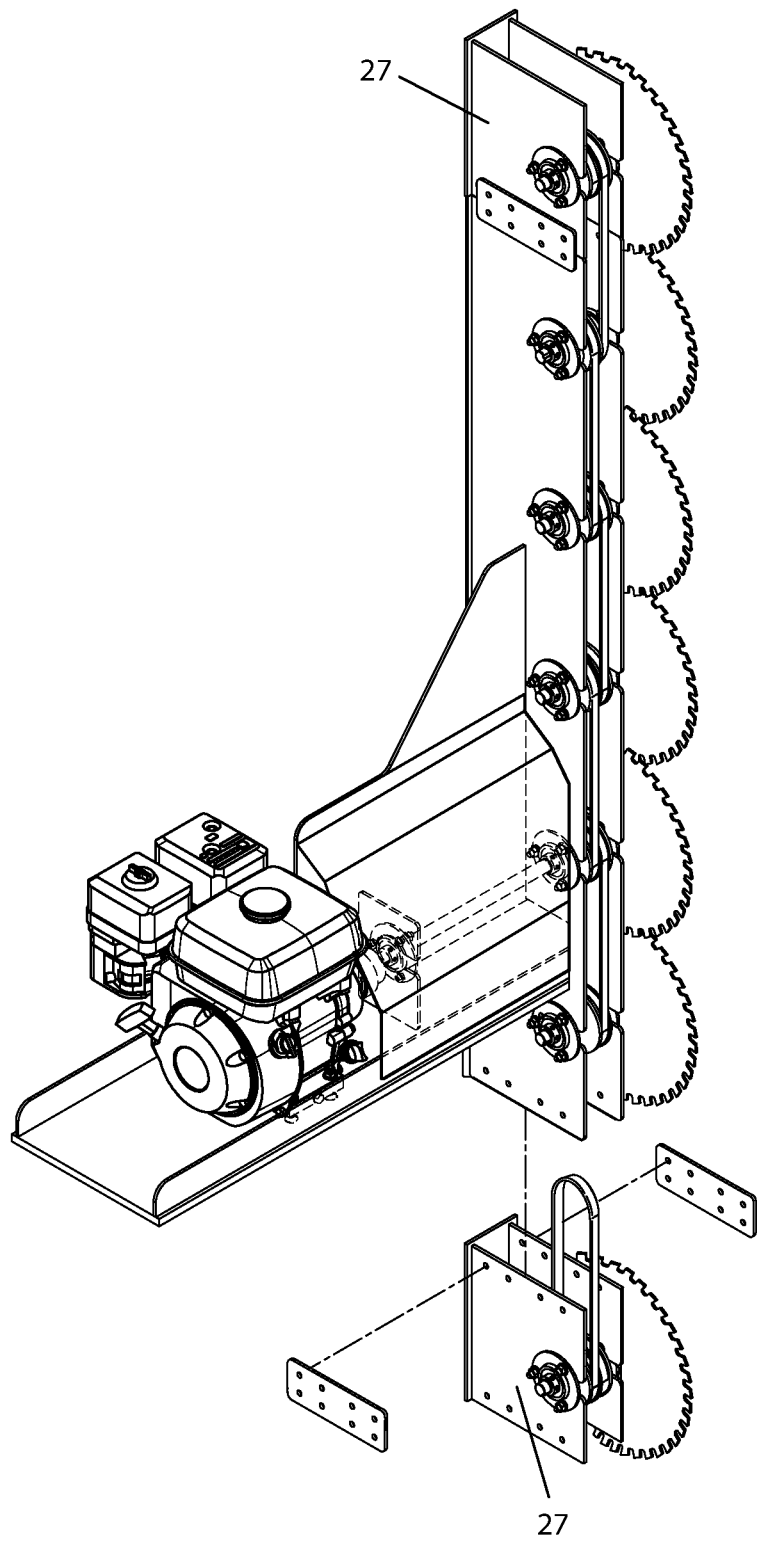
FIG. 24 is another embodiment of the invention, showing two modular attachment members in use with the mast member.

In another embodiment shown in FIG. 24, the mast member 7 further has at least one modular attachment member 27. A plurality of modular attachment members is preferred. Some vehicles have higher or lower racks, so the modular attachment members are useful additions to install onto the top of the mast member and/or onto the bottom of the mast member for reaching higher and/or lower hanging limbs. The top plate 15 or cap of the mast member 7 is removed, then one or more modular attachment member 27 is installed and secured to the upper end of the side walls 13 and the rear wall 14, then the top plate 15 is re-installed and secured to the uppermost portion of the modular attachment member 27. Each modular attachment member has a rear wall, two, side walls, and a cutting, assembly having a single cutting member and a pulley system. The bottom of the mast member and the bottom of the modular attachment member is open so that debris can fall through. The modular attachment member has side walls and a rear wall having the same width dimensions as the main mast member's width dimensions. The modular attachment member also has a plurality of apertures 18 along the upper and lower sections of each of its side walls. Thus, the modular attachment member is essentially an extension of the mast member. A modular front wall may also be added to the modular attachment member.

To install the apparatus on a vehicle, such as an ATV, the support platform is positioned over the front rack of the ATV, then secured with a clamp and fasteners. The apparatus is a complete assembly with the power source is pre-secured to the base of the support platform with fasteners. The main drive shaft member and other fittings are all pre-connected to the power source, to the shaft support plates, and to one of the cutting members. The mast member and the cutting assembly are already connected to the support platform as well.

To operate the apparatus, the power source, namely the internal combustion engine, is started. The main drive shaft member transmits power to the slave shaft members to rotate each of the cutting members. Due to the vertical orientation of the mast member, the cutting members are able to easily reach and, cut limbs, branches, and brush within the cutting height of the apparatus as the vehicle travels along the path or trail. The rear wall of the mounting plate and the brace of the support platform help deflect falling debris away from the driver. To further adapt the apparatus to reach higher or lower areas, modular mast members, each of which having a cutting assembly, may be installed above and/or below the main mast member and secured with bolt fasteners. The modular cutting assembly addition is designed for the apparatus is slave driven from the existing apparatus because an additional pulley system is coupled to the existing pulley system.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A limb and branch trimming apparatus removably mountable to a vehicle selected from the group consisting of an all-terrain vehicle, a utility vehicle, a golf cart, and combinations thereof, the trimming apparatus comprising:
 a. a cutting assembly having a plurality of cutting members, a plurality of fastening mechanisms, and a pulley system, with each of the cutting members defining a hole for engaging with one of the fastening mechanisms, and with the pulley system having a plurality of groove pulleys and a plurality of belts traveling within the groove pulleys wherein the pulley system operatively rotates each of the cutting members;
 b. a frame having
  i. a support platform having a base, an upstanding brace, two shoulders, an angled corner plate, and an upstanding shaft support plate defining a bore, with the brace, the two shoulders, the corner plate, and the shaft support plate each being affixed to the base of the support platform; and
  ii. an upstanding mast member having a first outer side wall and a second inner side wall, a rear wall, and a top plate, with the top plate abutting a top of both of the two side walls and a top of the rear wall, with each of the two side walls defining a plurality of bores for receiving the fastening mechanism of each of the cutting members, and with the mast member abutting against an end of the support platform;

c. an internal combustion engine of the apparatus for powering both a drive assembly sand the cutting assembly independently from a vehicle's power source;
d. the drive assembly having a main drive shaft member and a plurality of slave shaft members,
   i. the main drive shaft member having a proximal first end and a distal second end, with the proximal first end of the main drive shaft member being insertable through each of the shaft support plate bore, one of the mast member two side wall bores, and one of the cutting members holes, with the main drive shaft member being rotatably engageable with the pulley system for driving all of the cutting members of the apparatus, and with the distal second end of the main drive shaft member coupled to the internal combustion engine of the apparatus; and
   ii. one of each of the plurality of slave shaft members being coupled to one of each of the cutting members and to the pulley system;
e. wherein the support platform supports the internal combustion engine and the mast member, with the base of the support platform being removably mountable onto a front portion of the vehicle or onto a front hood or a rack portion of the vehicle;
f. wherein the first and second side walls of the mast member form a channel, with at least a first of the first side wall plurality of bores being aligned with at least a first of the second side wall plurality of bores to support one of the cutting members and one of the plurality of slave shaft members, with a second bore of the first side wall being aligned with a second bore of the second side wall to support one of the cutting members and the main drive shaft member, and wherein the plurality of cutting members being positioned at the outer side wall and secured with the fastening mechanism; and
g. wherein the first outer side wall being offset from the rear wall, and with the rear wall and the upstanding brace of the support platform being used as a shield to protect a driver of the vehicle from debris.

2. The trimming apparatus of claim 1, each of the plurality of cutting members comprising a circular saw blade having a plurality of spaced apart teeth, wherein the blades are arranged along the mast member in a staggered or overlapping arrangement.

3. The trimming apparatus of claim 1, the drive assembly further comprising a centrifugal clutch, a linear alignment coupling, and a plurality of shaft support bearings, each coupled at the distal second end of the main drive shaft member, with at least one of the shaft support bearings being coupled at the proximal first end of the main drive shaft member.

4. The trimming apparatus of claim 1, said apparatus further comprising at least one modular attachment member comprising a secondary mast member, at least one of the cutting members positioned on the secondary mast member and secured with the fastening mechanism, and a modular pulley system engageable with the apparatus pulley system, with the secondary mast member having two opposing side walls, a rear wall, and a removable front wall; and wherein the modular attachment member may be installed above or below the apparatus mast member.

5. The trimming apparatus of claim 1, the plurality of groove pulleys of the pulley system comprising at least one single groove pulley and at least one double groove pulley, with one of the plurality of pulley belts traveling within both the single groove pulley and the double groove pulley, and with the main drive shaft member being coupled to the double groove pulley; wherein each of the pulley belts being adapted to slip from the groove pulley to protect the apparatus from damage during a cutting bind, and wherein the pulley system transfers power along the length of the mast member through the plurality of belts which connect the pulley system to the internal combustion engine for operatively rotating each of the cutting members.

* * * * *